July 9, 1935. J. H. ROBERTS 2,007,345
MACHINE FOR FABRICATING LONG STOCK AT SUCCESSIVE LINEAR PORTIONS
Filed Oct. 23, 1928 7 Sheets-Sheet 1
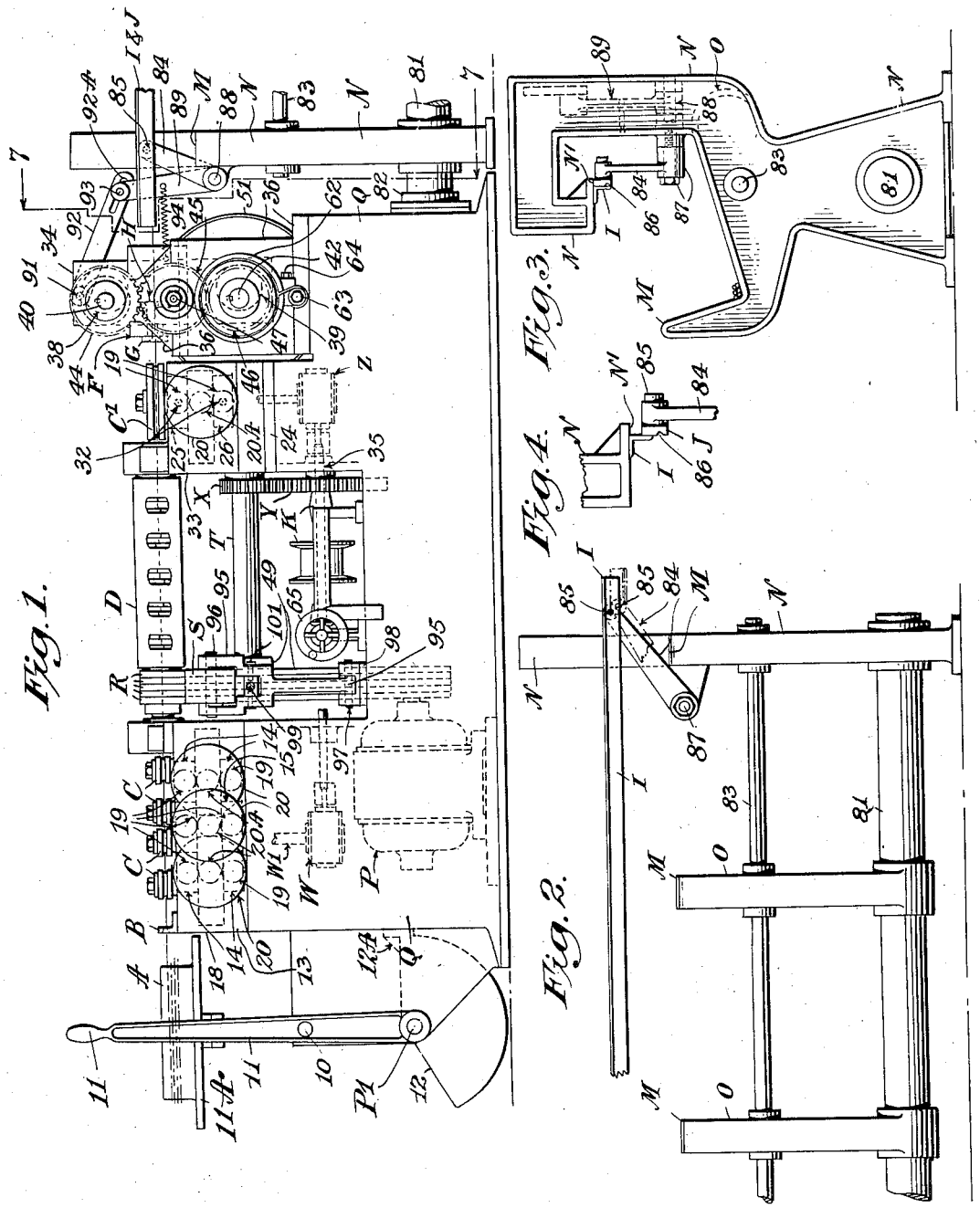
INVENTOR:
Joseph H. Roberts
BY
Philip Farnsworth
his ATTORNEY.

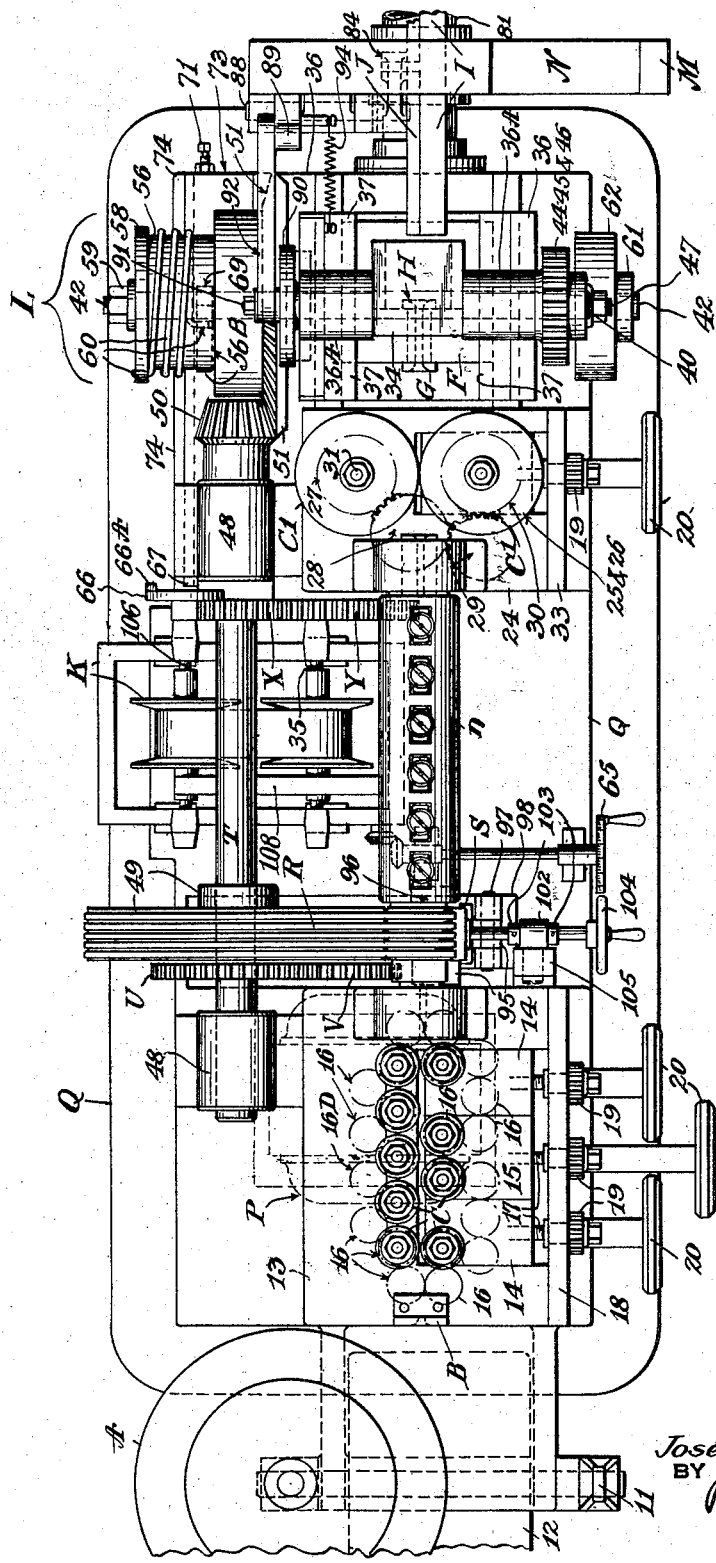

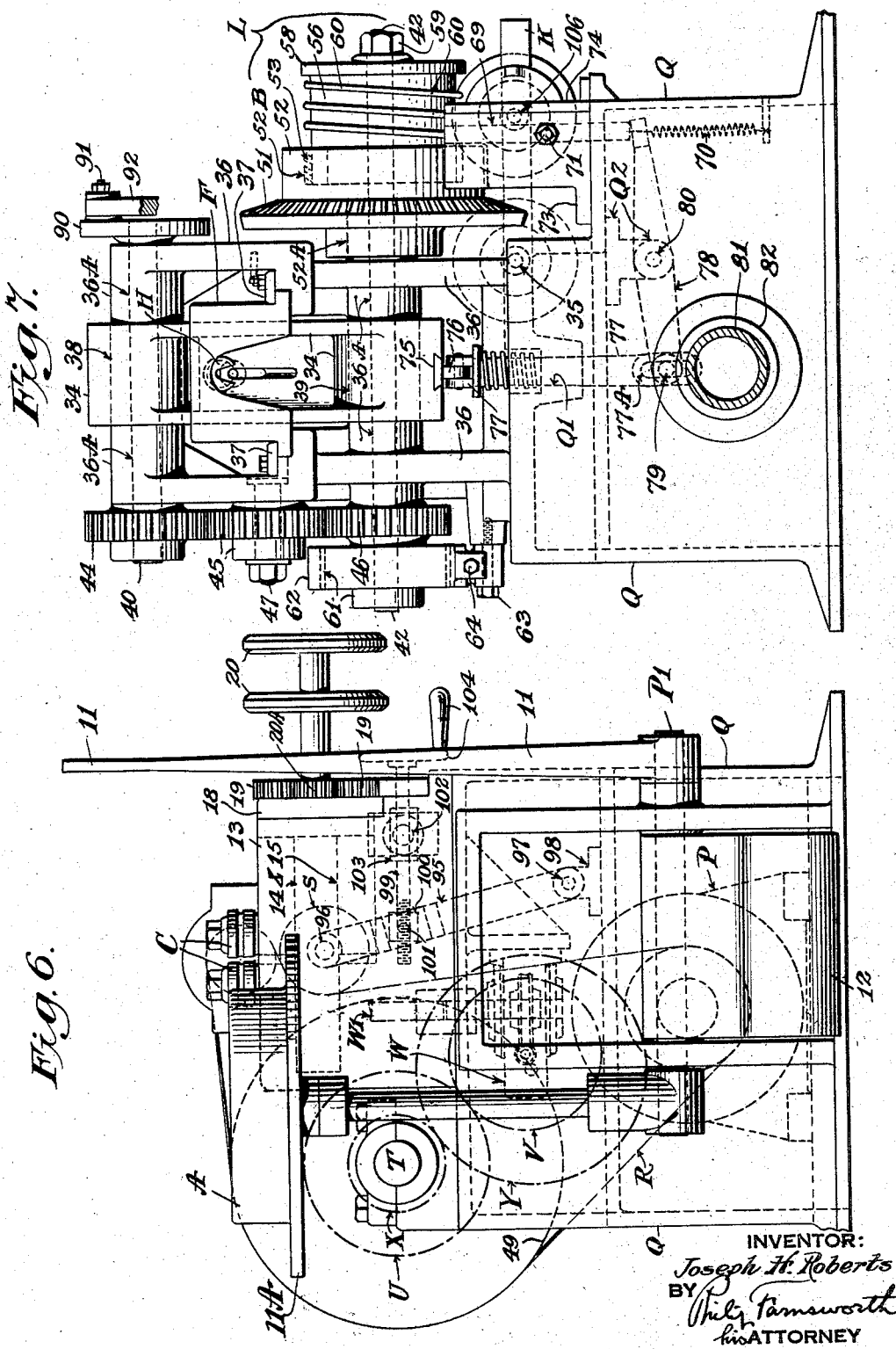

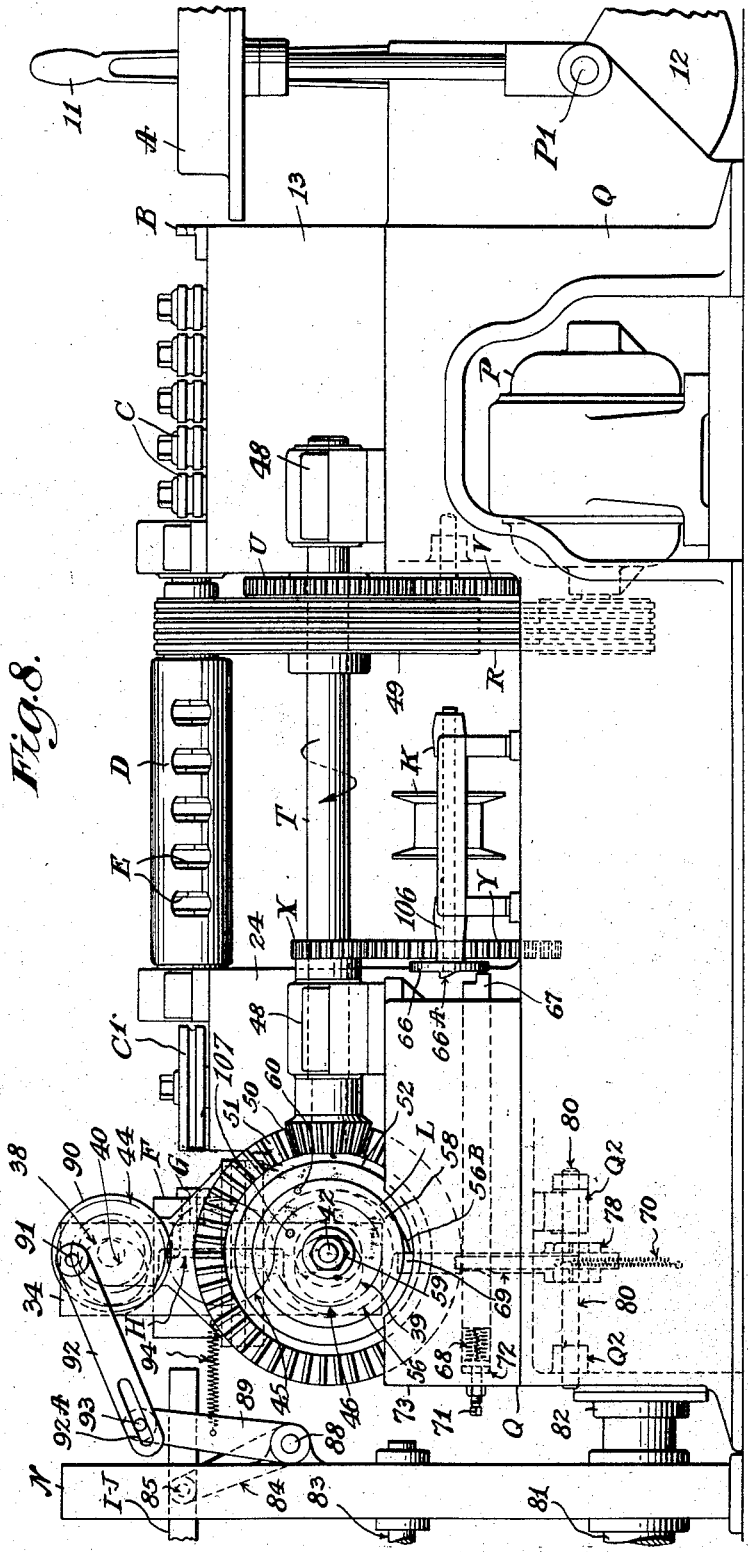

July 9, 1935.　　　　J. H. ROBERTS　　　　2,007,345
MACHINE FOR FABRICATING LONG STOCK AT SUCCESSIVE LINEAR PORTIONS
Filed Oct. 23, 1928　　　7 Sheets-Sheet 5
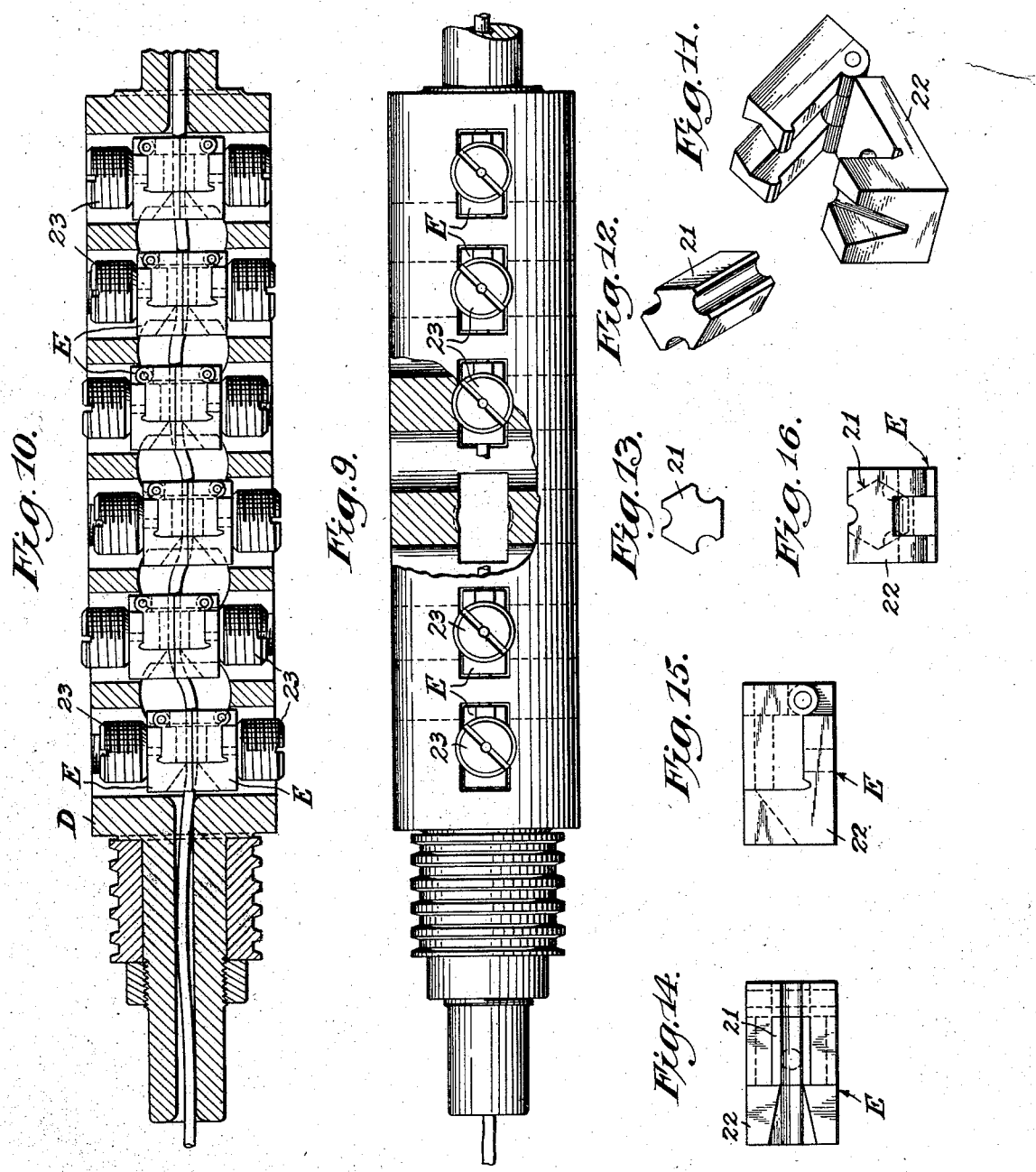
INVENTOR:
Joseph H. Roberts
BY
Philip Farnsworth
his ATTORNEY.

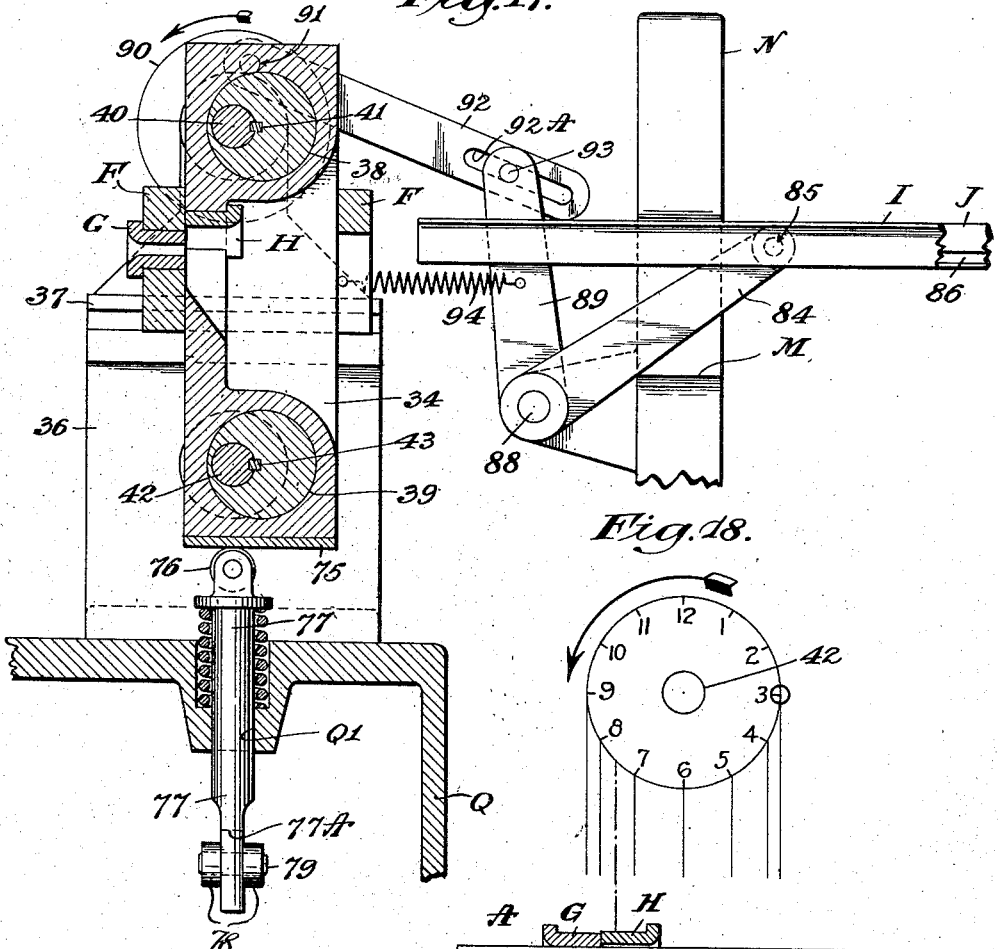
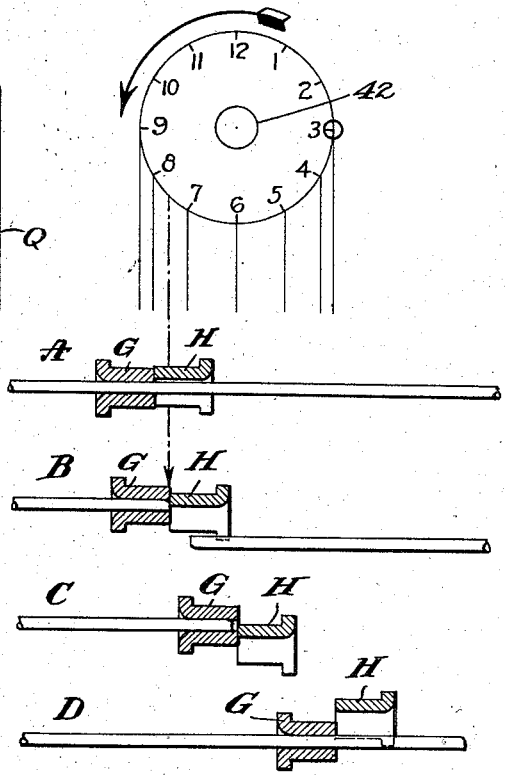

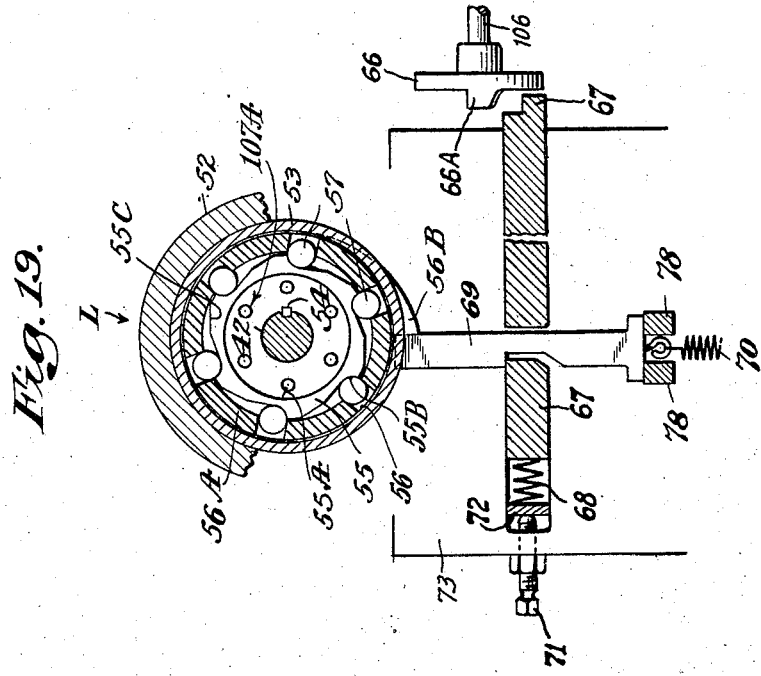
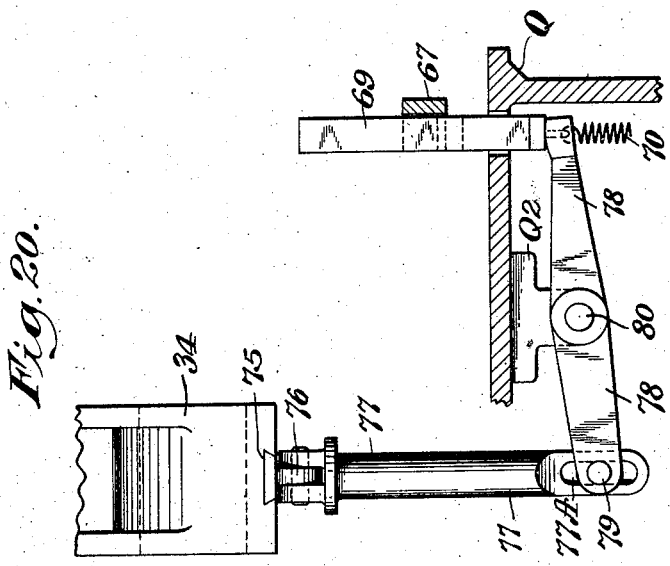

Patented July 9, 1935

2,007,345

UNITED STATES PATENT OFFICE 2,007,345

MACHINE FOR FABRICATING LONG STOCK AT SUCCESSIVE LINEAR PORTIONS

Joseph H. Roberts, Waterbury, Conn., assignor to The F. B. Shuster Company, New Haven, Conn., a corporation of Connecticut Application October 23, 1928, Serial No. 314,338

62 Claims. (Cl. 140—140)

This invention relates to machines for fabricating long metal stock such as rods, tubes or fairly thick wires or flat long relatively narrow sheets wherein the stock, as it travels linearly thru the machine, is subjected to a fabricating operation or successively to a plurality of fabricating operations such as punching, shearing, etc., particularly where any such kind of fabrication is effected on successive portions of the length of the stock which are uniformly separated from one another, as in the exemplary machine of the drawings where the stock wire, tube or rod in this example is fed to shearing apparatus which operates so that uniform lengths are cut successively from the successively forward end portions of the stock, notwithstanding that the shearing apparatus is reciprocatory and moves rearward in a direction opposite to the feed of the stock as a preliminary to the shearing operation which is conducted while the stock is in its normal feeding motion without any stoppage or slowing up relative to the motion of the shearing mechanism; the shearing apparatus at the instant of shearing moving in the same direction as the stock and at substantially the same rate.

More specifically the invention relates to such machines as the above wherein the metal stock is subjected to the action of straightening or leveling means as it is being fed to the shearing mechanism or to or from other fabricating devices.

The object of the invention is to improve the construction and operation of the above types of machines, i. e., machines for fabricating long stock at successive linear portions.

In accordance with the present invention and in the exemplary machine, the stock is fed continuously without stoppage to permit shearing while the stock is stationary as heretofore commonly practiced, the shearing being effected by a light-weight traveling, flying or aerial mechanism which intermittently is given an excursion which is short as to distance and time, and involves both horizontal and vertical motions at successive occasions after intervals of its rest while the continuous feed of most of the length of the stock occurs, the stock continuing to be fed also during such excursions of the shearing mechanism and continuously as long as the machine as a whole is in operation. And during each of such short excursions of the light aerial shear the latter is operated to cut off a portion of the forward end of the stock while the entire length of the stock in the main portion of the machine is in feeding motion. Furthermore the successive cut short lengths of a long length of stock are of uniform linear dimensions owing to the fact that the apparatus is so constructed and arranged that the excursions of the light shearing apparatus are coordinated with the rate of stock-feed. And adjustments are provided so that the operator at will can select any desired linear dimension within wide limits for the uniform lengths of the cut stock for a given job. This operation of the light aerial shear avoids the need of interrupting the stock-feed and thereby permits an increase of about three inches of stock-feed for each shearcut as compared with the prior machines wherein the stock-feed was intermitted to permit shearing by mechanism which did not travel with the stock; so that, assuming about twenty cuts per minute, from stock moving from about 75 feet and upwards per minute, there is an increased output from the new machine as compared with such a machine having a stationary shear of about five feet of stock per minute, which amounts to an increase per day of two or three thousand feet of stock per machine without any speeding up of the machine including the stock-feeding means to an undesirable degree.

The invention consists of the structural improvements and combinations pointed out in the claims and disclosed by way of example in the drawings which comprise various views of one machine including Fig. 1 which is a front elevation of the main left-hand portion of the machine, in which the stock is fed from left to right;

Fig. 2 a front elevation of the right-hand continuation of the left-hand or main portion shown in Fig. 1, Fig. 2 showing the means for receiving and the means for discharging the relatively short lengths of stock which have been sheared;

Fig. 3 an end view of Fig. 2 not showing the main or left-hand portion of the machine shown in Fig. 1;

Fig. 4 a detail of the assembly of the stock-receiving and discharging apparatus of Figs. 2–3;

Fig. 5 a plan of the main machine of Fig. 1;

Fig. 6 an elevation of the left end of the main machine of Fig. 1, the front with operator's controls being shown at right;

Fig. 7 a vertical section of Fig. 1 at 7—7, looking toward the left;

Fig. 8 a rear elevation of Fig. 1;

Fig. 9 a view of flyer D of Fig. 1, being a comparatively enlarged showing of said flyer which is a rotary straightener;

Fig. 10 a section of flyer D partially in elevation;

Fig. 11 a perspective of one of the die-holders 22 for said flyer D;

Fig. 12 a perspective of the die or wearing-piece 21 for such holder 22;

Fig. 13 an end view of Fig. 12;

Figs. 14–16 detailed views showing assembly of die 21 in holder 22;

Fig. 17 a sectional detail assembly showing the relative positions of the parts of the fabricating or shearing apparatus in their normal positions of rest just before commencement of their intermittent cycle of operations;

Fig. 18 a diagrammatic showing of the operations of the shearing-dies;

Fig. 19 a sectional detail assembly viewed facing Fig. 1 showing the slave apparatus L of Fig. 5 from the front including the roll-locking clutch and associated apparatus controlling the timing of the repetition of the fabricating operation as by the horizontal excursions of the shearing members shown in Figs. 17–18; and Fig. 20 an elevation partly in section showing sufficient of the lower part of die-carrier 34 of Fig. 17 to illustrate the operation of the latter in re-latching or re-cocking the clutch or slave apparatus of Fig. 19 which performs the work of heavy duty.

In the exemplary machine disclosed, adapted for stock of various diameters, the general construction and operation are as follows. The metal wire tube or rod of given diameter constituting the stock to be fabricated or long metal sheets may be treated in a machine embodying various of the principles of the exemplary machine usually comes in coils, the stock in each coil being several hundred feet long more or less and weighing several hundred pounds more or less. The operator places one of these coils on the tilting reel A, Fig. 1 at left. Or the stock need not be coiled but may come directly from other manufacturing steps to the operations of a machine embodying various features of the present invention. The operator then inserts the free or crop end of the reeled stock thru guide B and pushes it forward to a position entering between horizontal rolls C, Figs. 1, 5–6 and 8, to be gripped thereby and thereby preliminarily straightened and fed rightward to and thru rotary flyer D where it is straightened finally whence the stock is fed beyond D into position entering between a pair of auxiliary and larger diameter horizontal feed-rolls $C^1$ which feed the stock both by pulling it thru D and by pushing it to the fabricating, in this case shearing, mechanism at the right of $C^1$ in Figs. 1, 5 and 8. After the machine has been set in operation for a given job it is kept in operation while the operator loads successive stock-rolls on reel A at left. Before starting operation the rolls C and $C^1$ are adjusted properly to grip the stock of given dimensions by manipulating the wheels 20 so as to insure uniform continuous feeding from the stock-coil on reel A forward thru flyer D to the shearing mechanism at the right. The stock after being preliminarily straightened by rolls C at left is pushed by them so that its forward end, right, enters and passes thru the hollow rotating flyer D, Figs. 1, 9–10, wherein by the contained offset dies E the stock is straightened further and finally. In the beginning of operations on a fresh roll of stock, as the forward end emerges from the right end of flyer D, being pushed by rolls C, it engages and is gripped by the auxiliary rolls $C^1$ which are pinch-rolls of large diameter, but rotated with the same periferal speed as rolls C, which thereafter insure that the rest of the length of the long coiled stock is pulled thru flyer D and is fed continuously rightward to the fabricating mechanism, herein shown as shearing mechanism at the right, Figs. 1 and 5. During the feed of most of the stock from a given stock-coil on reel A the rolls $C^1$ cooperate with the rolls C in the continuous uniform stock-feed. And the tail end of the stock-coil on reel A is pulled rightward by rolls $C^1$ thru flyer D after the rear end of the stock has passed beyond rolls C; rolls $C^1$ then pushing such tail-end thru the fabricating mechanism adjacent (right of) rolls $C^1$. As the successive linear portions of the long stock are pushed rightward by the tractive contact of their rear portions with rolls $C^1$ they pass thru the orifice in shearing die G and underneath die H, Figs. 1, 5 and 17; or the stock passes thru the action of a sawing or cutting tool; or the stock first before reaching the shearing mechanism shown may be engaged by other fabricating mechanism such as a punch and die, not shown but resembling the disclosed shearing mechanism in the general principles of operation and control hereinafter described, followed by the above shearing, sawing or cutting operation as a final fabrication prior to discharge from the machine; the stock moving continuously rightward thru die G and beneath die H, shearing members, to the stock-guides I, J, Figs. 2–4. At a certain point of the rightward stock-feed the shearing members G, H commence the leftward movement of a complete horizontal excursion from and back to their normal state of rest shown in Fig. 17, and during such leftward movement the die H is elevated, higher than in Fig. 17, as in a pile driver in preparation for its subsequent downward shearing hammer blow here effected by a positive forceful downward drive of the light-weight die H; the striking of the stock by die H in its said downward movement occurring at a certain instant during the horizontal rightward return of G and H to their normal positions of rest; the downward movement of H occurring after a desired length of the stock has been fed by rolls $C^1$ between guides I, J; and die H being forced downward positively by the comparatively heavy fly-wheel 51 Figs. 1 and 5, while the light-weight shearing mechanism is moving rightward with the stock, so that thereupon a short length from the forward portion of the stock is sheared off by dies G and H, such short length then dropping down into receiver M, Fig. 3, as a completed product of the machine here shown. Thereupon dies G and H complete the rest of their horizontal excursion by moving further rightward to their normal positions of rest in preparation for the next shearing operation on a rear portion of the long unsheared stock which meanwhile and after the first shearing operation is fed from reel A toward the point in its horizontal linear course where die H again is forced down for shearing during its rightward movement with vertically-stationary die G. Later descriptions will disclose the entire construction of the light aerial shearing mechanism.

The construction and operation of the apparatus on which are placed the coils of stock to be fabricated are as follows, including particularly the tilting reel or drum A which carries the stock-coil, Figs. 1, 5, 6 and 8, reel A being shown in its normal position in which the plane of the reel and stock-coil are horizontal and the horizontal feed-rolls C are pulling the stock from the coil into the machine. When all the stock of a given coil has been pulled by rolls C from off A the operator without stopping the machine, which continues to operate on the rear portions of such coil, removes pin 10 which normally holds reel-handle 11 to machine-bed Q; and he then turns handle 11 on its pivot P¹ a quarter-revolution anti-clockwise from the twelve o'clock position shown, Fig. 1, to a nine o'clock position where part 11A of reel A rests on the floor, the counter-weight 12 thus going to three o'clock. The heavy stock-coil next to be fabricated then conveniently is moved from the floor to a position encircling reel A in its lowered position. Thereupon the operator by handle 11 aided by counterweight 12 raises, via pivot P¹, the stock-coil on drum A into the position shown wherein the plane of the drum is horizontal and its axis vertical, the part 12A integral with 12 abutting against frame Q. If desired the axis of drum A in its raised position may be horizontal or at any angle between vertical and horizontal to adapt it to other feeding arrangements. Drum A may be of any desired construction. When the stock-coil is on reel A in the position of the latter shown then the operator replaces pin 10 for locking and inserts the free end of the rolled stock thru guide B and pushes it between the first pair of rolls C.

*Feeding and straightening*

Rolls C are for initial stock-feeding and the staggered ones intermediate the end-rolls for preliminary stock-straightening, the rolls C¹ to the right, Figs. 1 and 5, being for final feeding after final straightening in flyer D. Initial-feeding, pinch, rolls C, first and last pairs, have vertical spindles and, Fig. 5, are arranged, in the rod machine disclosed, all in the same horizontal plane and in two rows on opposite sides of the path of the stock, being periferally grooved, Fig. 1, to receive the rod or wire. The same applies to the intermediate flattening rolls. The rolls in the back row, Fig. 5, are mounted on spindles mounted in fixed roll-support 13. The spindles of the rolls in the front row are mounted in bearing-boxes or movable supports 14—15 which are adjustable transversely of the machine to and from the rear rolls by operator's wheels 20, at left, Fig. 5. All the spindles of rolls C in both rows are rotated positively by a series of intermeshing gears 16—16D, see pitch circles, Fig. 5, via 16D driven by worm-gear reduction unit W, Fig. 1, as will be described. The transversely adjustable box-supports 14, 15 for the front row of rolls C are six in number, three pairs, and are adjusted by the six threaded screws 17, Fig. 5, turned by wheels 20; screws 17 being journaled in side plate 18 of roll-support 13. Spur gears 19 are mounted on screws 17 and mesh with spur gears 20A, Fig. 1, turned by wheels 20 to adjust the front-row rolls toward the rear-row rolls and the stock between front and rear straightening rolls.

After the stock leaves the last of rolls C at the right it is pushed and pulled thru hollow rotary flyer D by rolls C and C¹ respectively for further and final straightening in D by passing thru dies E, therein, Fig. 10, staggered or offset with respect to one another in decrescent degree from left to right in direction of stock-feed left to right. During the progress of the stock thru the staggered dies E the latter are rotated by belt R which rotates D thereby kneading the stock and executing the final straightening operation. Each of dies E includes a steel holder 22, Fig. 11, containing a removable, renewable wearing piece 21, Figs. 12-14 and 16, preferably of non-ferrous metal, as brass, which is grooved, as shown for example, to conform with the diameter of the stock to be fabricated. Each wearing member 21 is locked in its hardened steel holder 22 by the hinged part of 22 shown. Clamping screws 23, Figs. 9-10, are adjustable to permit the adjustment of dies E to their staggered or offset positions shown, at the right, at the end of the final straightening operation, the last two dies being almost in alinement. The hexagonal cross-section of each wearing member 21 provides a substantially solid seat for engaging the holder 22 diametrically opposite each of the three grooves and provides an advantageous means of locking member 21 in holder 22. The drawings show clearly how 21 is locked in place upon the closing of the hinged portion of 22. The construction of 21 permits cheap manufacture from long brass stock by sawing off short lengths therefrom for each piece 21, such long stock before being sawed up having been fabricated as a whole in suitable mills to have the general hexagonal cross-section shown. The sawed short lengths are ready for use in holders 22 without any further machining. The three grooves in each piece 21 may be used successively by removing 21 from the holder 22 and replacing it therein so that another groove contacts into the passing stock (Fig. 10).

Horizontal feed-rolls or pinch-rolls C¹, Figs. 1, 5 and 8, are two in number gripping the stock between their grooved periferies; they are substantially larger in diameter than initial feed-rolls C, and they are rotated in horizontal planes on their vertical spindles 31, Fig. 5, by spur gears 27—30 from worm-gear reduction-unit Z, Fig. 1, as will be explained. These rolls C¹ are located in housing 24 having vertical cover-plate 33, Fig. 5. The rear roll is mounted vertically in non-adjustable position in housing 24. The front roll is adjustable with respect to the rear roll being mounted in bearing boxes 25, 26 which are adjustable transversely of the machine by means of hand-wheel 20 which operates gearing which moves said boxes, as follows, Fig. 6. Wheel 20 turns spur gear 20A between and meshing with spur gears 19 fixed on rotary adjusting screws 32, Fig. 1, the rear ends of which are threaded in the boxes 25, 26 respectively so that the latter carrying the front roll is moved to or from the rear roll as wheel 20 is turned. The front ends of adjusting screws 32 are journaled, Fig. 5, in vertical plate 33 of housing 24.

From flyer D the rolls C¹ feed the straightened stock to the shearing mechanism at the right.

*Shearing*

An important feature of the present invention is the construction and arrangement of the shearing mechanism and its controls by which the portions of the stock which are cut successively from its successive forward ends are caused to be of uniform length notwithstanding that the shearing mechanism intermittently participates in the continuous feeding motion of the stock imparted by rolls C and C¹.

This uniformity-mechanism includes a master and slave, each illustrated as combinations of mechanical elements.

The slave includes, for example, a roll-locking one-revolution clutch L, Figs. 5, 7, 8 and 19, preferably of special design which together with associated mechanism does the work of operating the shearing members or dies G, H to move them into positions to shear, and to do the heavier work of moving H downwardly actually to shear, the more or less thick metal stock, as steel.

The master preferably is a variable adjustable speed transmission K, Figs. 1 and 5, which is adjustable by the operator by graduated handwheel 65 for a given job of desired length of cuts and which trips slave clutch L and starts it working to operate the fabricating members at the time proper to insure the cutting or other fabrication at portions of the stock uniformly distant from one another; the construction of slave L furthermore being such that it always acts uniformly, i. e., the same time always elapses at a given operator's adjustment of master K for a given job between the instant when slave L is tripped by master K and the instant when L forces down die H by heavy fly-wheel action actually to shear the stock; and master K is so constructed and adjusted and coordinated with the feed of the stock that at a given adjustment it always trips slave L at the instant when the same length of stock has passed rightward beyond H onto guides I, J in preparation for shearing, and causes dies G and H to produce successive cut lengths of the stock which have the same linear dimension. Thus master K in effect is a stock length measuring apparatus which lays out and directs the work to be done by slave L. While the latter and the cooperating driving parts possess ample mass for heavy duty yet the rotating and reciprocating shear parts are of very low mass making practicable their intermittent starting and stopping and reversals of motion and a speed of one foot and upwards per second.

*Discharge*

As soon as a right end of the stock is sheared off by the downward movement, Fig. 17, of die H alongside vertically-stationary die G while both dies are moving horizontally rightward with the traveling stock and at substantially the same rate, then the guides I, J are separated from one another, J going down, permitting the cut lengths to be discharged by gravity into the trough formed by the arms M of the receiving rack N, O, Fig. 3. Also following upon the completion of shearing then slave L, including the disclosed novel design of roll-locking one-revolution clutch of Figs. 5, 7, 8 and 19, causes the raising of die H back into its normal position relative to die G Fig. 17 there to remain during continuation of feed of the stock thru G and under H. There, Fig. 17, in the positions of rest of both said dies they await, while most of the next length of stock is being fed, the next tripping of slave L by master K. Before the next horizontal excursion of dies G and H, during which H is to make its vertical excursion, the rear stock, from which a forward end has been cut, is fed rightward until the instant of the next tripping of slave L by master K to effect the actions of G and H at times proper to shear another portion of the stock of the same length as that previously sheared.

*Main power connections*

All the power-driven parts of the machine are driven by prime-mover P, Figs. 1, 5 and 8, mounted within machine-pedestal Q. P may be any desired form of prime mover, preferably an electric motor, which may be but need not be one of constant speed. From P a flexible multi-strand belt R extends upwardly, Fig. 1, driving the main shaft T, idler pulley S and flyer D, Figs. 5, 6, 8.

Pulley S, Figs. 1, 5 and 6, permits maintenance of proper tension on belt R by operator's adjustment of wheel 104 at the front of the machine. Pulley S is pivotally mounted in cradle 95 on stud 96, Figs. 1, 5 and 6. Cradle 95 is mounted pivotally on stud 97 of bearing bracket 98, Figs. 1, 5 and 6. Wheel 104 operates adjusting screw 99 to move cradle 95 and pulley S toward belt R. Screw 99 engages in swivel nut 100 which is suspended pivotally by the two studs 101. Screw 99 is supported pivotally by pivot 102 held in position by collars 103. Pivot 102 is supported by bracket 105 secured to roll support 13.

Main shaft T, Fig. 1, middle, extends longitudinally from left to right of the machine; is journaled in pillow-block bearings 48, Figs. 5 and 8, and is rotated by sheave-pulley 49, Figs. 1, 5, 6 and 8, over which multi-strand belt R passes.

Power is distributed from main shaft T to feed-rolls C and $C^1$, master K, adjustable speed transmission, and slave L, the one-revolution clutch, as follows.

To rolls C, Figs. 1, 5, 6 and 8, power goes from T via spur gears U, V, left of belt R, Fig. 5, and standard worm-gear reduction unit W, Figs. 6 and 1; and a spindle $W^1$, Figs. 1 and 6, is coupled to W, extends upwardly therefrom and carries one, 16D, Fig. 5, of the intermeshing gears 16, 16D which drive rolls C. The vertical arrangement of the roll-spindles permits employment of the standard gear reduction-unit.

To rolls $C^1$, the feed-rolls auxiliary to rolls C, power from main shaft T goes via spur gears X, Y, Figs. 1, 5, 6 and 8, and worm-gear reduction-unit Z, Fig. 1, from which upwardly extends a spindle of one, 27, Fig. 5, of the four intermeshing spur gears 27—30, Fig. 5, which drive the two rolls $C^1$, the pitch diameter of the gears being shown in Fig. 5. Here again the vertical spindles of rolls $C^1$ permit employment of the standard gear reduction-unit.

The same spur gears X, Y also convey power from main shaft T to master K, the disclosed adjustable-speed transmission, via constant-speed shaft 35, Figs. 1, 5 and 7; so that master K is driven indirectly by prime-mover P which also drives the feed-rolls C and $C^1$. The only function of master K is to revolve master-cam 66A at the rate which will control the production of cut stock of the desired uniform length.

To slave L, Figs. 5, 7, 8 and 19, power from main shaft T is delivered, Figs. 5 and 8, via bevel-pinion gear 50 mounted on the right end of shaft T. Gear 50 meshes with heavy fly-wheel bevel gear 51, Figs. 1, 5, 7 and 8, which is mounted on fixed to clutch-drum 52 on quill-hub 52A thereof. This continuously rotating fly-wheel and drum 52 provide the moment of inertia which conveys ample shearing power to the light-weight aerial shear of Fig. 17. Normally said drum 52, Fig. 19, and gear 51 rotate idly without turning their concentric one-revolution shaft 42, Figs. 17 and 19, directly on which the one revolution clutch L is mounted so that one cycle of operation of the shearing mechanism is effected for each of the intermittent single revolutions of the clutch. This shaft 42 of the clutch, Fig. 19, is the main shearing-shaft, Fig. 17. But when master K trips slave L then gear 51 and clutch-drum 52 cause a single revolution of shaft 42 which effects the desired horizontal movements of shearing members G and H along the stock-path and also effects the down and up excursion of die H which takes place midway of the rightward movement of G and H so as to effect the actual shearing of the stock while said die H is moving horizontally with the stock in the same direction and at the instant when all three of G, H and the stock are moving at substantially the same rate; altho said uniform movement of die H with the stock is only during the very brief time of the actual shearing operation as will be described with reference to Fig. 18.

*Master connections to slave*

The mechanisms of master K and slave L which are interconnected to cause K to trip L to start intermittent shear-movements are as follows, Fig. 5. Cam or eccentric 66A, Figs. 5, 8 and 19, on disk 66 is revolved by master K, shaft 106 carrying 66, thereby engaging sliding detent 67, Fig. 19, of slave apparatus L causing, Fig. 5 a slight rightward movement of 67 (leftward in Figs. 8 and 19) toward and against spring 68, compressing the latter, by which movement 67 is withdrawn rightward, Fig. 5, (leftward in Figs. 8 and 19), from its normal position in which it locks clutch stop-plunger 69, so that the latter is pulled down by its spring 70 thereby withdrawing the upper end of plunger 69 from its normal position wherein stop nose 56B locks clutch L and its shaft 42 from rotation by drum 52 always in rotation by fly-wheel gear 51 mounted thereon and driven by pinions 50 on main shaft T. This sliding action of detent 67 starts the clutch in operation to drive the shaft 42 and initiate the excursion of the fabricating mechanism including shearing tools G and H. Shaft 106 is the variable-speed shaft of the master-mechanism K, and is adjusted to different speeds by graduated hand-wheel 65, Figs. 1 and 5, so that the rate of revolution of cam 66A is that which causes tripping of clutch L at the proper time to produce the desired length of sheared stock. The scale of 65 may be marked on a dial geared down to the shaft of 65.

*Slave connections to fabricator*

The mechanism by which power is conveyed from fly-wheel 51 and drum 52 of slave-clutch L to dies G and H is as follows,—this mechanism beginning to operate said dies forthwith when L is tripped by K to operate detent 67 as above to cause clutch shaft 42 to be rotated by the continuously-rotating fly-wheel 51 and clutch drum 52. On clutch shaft 42, Fig. 19, is fixed an eccentric or cam 39 Figs. 1, 8 and 17, and on the latter is mounted the die-carrier 34, so that when 42 being the one-revolution shaft of slave-clutch L is set in rotation, then said carrier 34 is given a corresponding eccentric or nutating motion with both vertical and horizontal components so that die H fixed in 34 is given movements likewise partially horizontal and partially vertical. Die-H-carrier 34 slides up and down thru a second carrier F for die G which is slidable horizontally and guided by gibs 37 on stationary support 36 for all this light-weight aerial shear apparatus of Fig. 17 in cooperation with eccentrics 38—39; so that the horizontal component of the movement of die-H-carrier 34 is permitted by the horizontal movement of die-G-carrier F. Die G is fixed to its carrier F which has only horizontal movement so that G does not participate in the vertical movements of die H; but both dies G and H are given horizontal movements while die H is being moved up and down; all these operations being caused by the single rotation of shaft 42, and 40, and its eccentric 39 by the one-revolution clutch L; the two dies G and H always remaining alongside one another.

As soon as cam 66A of master K, Figs. 5, 8 and 19, is revolved past the end of slide 67, Fig. 19, then the compression of spring 68 moves detent 67 partially to the right in readiness to permit the downward movement of carrier 34 to act to disconnect shear-shaft 42 and the driven member of clutch L from clutch-drum 52 continuously driven by main shaft T via fly-wheel gear 51. A brake 61 is provided at the end of the one-revolution shaft 42, Figs. 1, 5 and 7, to prevent continuation of rotation of said shaft by the moment of inertia of the driven member of clutch L and of the fabricating mechanism operated by said driven member, after disconnection of drum 52 from the fabricating mechanism, so that neither shaft 42 nor dies G or H will be carried beyond the positions of rest, Fig. 17, which they occupy normally during the greater part of the time, i. e., while the clutch L is not operating shaft 42 and while the greater part of the stock-feed is taking place. Said brake includes drum 61 and a flexible band 62 encircling it and lined with frictional material, such as leather, the band 62 being anchored by stud 63 to stationary machine-member 36 and being adjustable via bolt 64 passing thru the band terminals; Figs. 1 and 7.

*Coordinated operation of fabricator and feeding motion of stock*

Below is described the mechanism of the exemplary machine by which dies G and H are operated in cooperation with the stock-feeding means, or otherwise coordinated with the stock-feed, so that the continuously moving stock is cut into equal lengths by the light aerial shear traveling for a very brief time uniformly with the stock; and this includes the details of master K and slave L.

Of the master K the variable or adjustable speed transmission in general is of any desired design of such well-known general type of apparatus. In the present combination of such transmission with the light aerial shear G, H, etc., such adjustable-speed transmission, Fig. 5, includes first the constant speed shaft 35 driven by motor P, second the adjustable-speed shaft 106 journaled in the stationary frame shown and carrying the tripper or master-cam 66A for starting the rotation of shear-shaft 42 by slave-clutch L, and third any suitable means such as that indicated in the drawings, Fig. 5, including graduated wheel 65 and mechanism interconnecting with K for adjusting the speed of shaft 106 to that rate which is necessary to coordinate the reciprocations of dies G and H to the rate of stock-feed so as to shear the stock into uniform lengths of the linear dimension desired, such adjustment being operated as by the graduated hand-wheel 65 and associated parts, Figs. 1 and 5. The scale on wheel 65, Fig. 5, is marked in feet or the like by the manufacturer of the machine during the initial operation thereof so as to indicate to the user the length of the stock-cuts by dies G and H for each given adjustment of wheel 65 by the operator for a given job; such scale markings indicating the coordination of the shear controls with the two sets of feed-rolls C and $C^1$ both positively driven by the same prime-mover P which operates master K and slave L, and, via L, the dies G, H. Thus the operator by wheel 65 can adjust the machine to produce the desired uniform lengths of cut stock without changing the normal feed of the stock by rolls C and $C^1$ driven like the shear-controls by motor P. When, as here, motor P operates not only the feeds for the stock but also the stock-shearing mechanism itself, the rate of stock-feed by C and C¹ is immaterial; because if it be varied by variation of P there will be corresponding variation of the times of operation of the shearing mechanism, owing to the fact that the feeding and shearing apparatus are coordinated as shown; so that always there will be a uniform distance between the points along the length of the stock where fabrication is effected.

The bevel gear with horizontal axis operated by wheel 65 is journaled in the frame shown and operates adjusting member 108 to the driving ratio of the two cone-faced pulleys shown on shafts 35 and 105 connected by belt as shown specially designed to cooperate with the cone-faces of the pulleys, all as well known.

The trigger or master-cam 66A which trips clutch L is formed, Fig. 5, as part of a circular cam-disk 66 mounted on the end of adjustable-speed shaft 106 of the adjustable speed transmission of master-control K. Each revolution of cam 66A occupies a time during which a length of stock is fed thru the machine, which length corresponds with the reading of the scale on hand-wheel 65 in the position to which the operator may have set said wheel for a given job.

Cam 66A, during a small arc of its revolution moves sliding detent 67, Fig. 19, to its retracted position to left from clutch-plunger 69 to initiate the action of clutch L on dies G, H. Thereupon the cam is carried past 67 and spring 68 moves 67 back to right in position to lock plunger 69 when the latter shall be raised by the downward movement of die-carrier 34, Fig. 20. Meanwhile the single rotation of clutch L proceeds for just the time necessary for the horizontal movements of dies G and H. This time is a very small proportion of the total time of feed of even the comparatively short cut stock-lengths, which normally are of the order of ten to twenty feet long more or less. Hence during most of the revolution of tripper-cam 66A it is out of engagement with sliding-detent or sear 67.

The construction of slave L including the one-revolution clutch, Fig. 19, is such that the excursion of dies G and H is commenced instantly upon or always at the same time relative to stock-feed after the action of cam 66A in starting clutch-shaft 42 in rotation by clutch-drum 52 and fly-wheel 51; and brake 61 insures that the normal zero positions of dies G and H, Fig. 17, always are the same so that the distance and therefore the time of their horizontal excursion to left and back to right always will be the same; that is, the time always will be the same for a given rate of stock-feed but will vary with the latter. Due to the above and to the fact that master cam 66A always trips slave clutch L when the same length of stock has been fed since the last previous stock-cutting, the result is that the downward shearing movement of die H against the stock always will take place after the same length of stock has been fed since the preceding shearing operation. That is, altho the continuously fed stock moves forward a slight distance after dies G, H commence their horizontal movements by commencement of rotation of shaft 42 and continue to move forward during the extremely short time of the downward shearing action of die H, and altho the actual shearing is not effected until after the dies commence the return of their horizontal excursions, yet the time interval between the tripping of clutch L and the actual shearing always is the same for a given rate of stock-feed and for a given setting of graduated hand-wheel 65 coordinated with the stock-feed, or for a given setting of any other scale which is an index of the automatic measurements by the master K of the length of parts of the stock to be cut. It is the construction and arrangement of the slave-clutch L and its combination with the shear-parts as shown which permit said time interval to be always the same for all stock-lengths which are cut thruout a given job, by preventing any variation of the time interval, relative to the stock-feed, between the retraction of detent 67, to left, Fig. 19, by master cam 66A and the commencement of rotation of shear-shaft 42 by clutch drum 52 and fly-wheel 51, i. e., between the retraction of detent 67 and the commencement of the cycle of operations of the shearing or other fabricating apparatus; the actual cycle of operations of the shear-parts after commencement by shaft 42 always occupying the same time relative to the stock-feed.

It is to be noted especially that in accordance with my inventions the detent or sear 67 or its equivalent in causing initiation of the cycle of the shearing or other fabricating mechanism may be operated by the forward end or van of the stock, instead of cam 66A as a part of master K, such generic master-control device, as detent 67, in such specific case being struck as a target by the stock-van to initiate the operation of a shear-operating member as 42 by a power device such as slave L; such stock-van operation of target-control in general being disclosed in my co-pending application for patent Serial Number 291,651 filed July 10, 1928.

The construction of slave-clutch apparatus L which causes commencement of the cycle of the shearing apparatus substantially instantly upon the tripping by the master cam 66A, or at least always at the same time after such tripping for a given rate of stock-feed, is as follows, see Figs. 5, 7, 8 and 19. Primarily this clutch L preferably is of the roll-locking type shown, altho it may be of other types as electromagnetic but in the present embodiment and combination there are various novel features which are included in the following description and shown in the drawings. When master-detent 67 has been withdrawn from stop-plunger 69, to left, Fig. 19, the latter is free to be and is pulled down by its spring 70 out of engagement with and in front of stop-nose or lug 56B integral with basket 56 for locking-rolls 57, Figs. 5, 7, 8 and 19. This causes normally-rotating clutch-drum 52 to be clutched to clutch-body 55 fixed to shear-shaft 42 for operation of shearing-dies G, H. The detent slide 67, its spring 68, the clutch-plunger 69 and the contact disk 72 engaged by master-cam 66A are housed in a casting 73, being retained in place therein by cover-plate 74. Screw 71 is provided for regulating the tension of spring 68. Rolls 57 are moved radially outward to lock drum 52 to body 55 and shaft 42 splined thereto at 34. Basket 56 for rolls 57 is mounted rotatively on extending hub 55A of clutch-body 55, being retained on said hub by plate 58, Figs. 5, 7 and 8; and said plate being held in place by the adjustable nut 59 on the reduced end of clutch-shaft 42. When plunger 69 has been pulled down from in front of nose 56B the basket 56 is free for rotation and is rotated, Fig. 19, clockwise by automatic means to be described, and such rotation causes fingers 56A, one for each roll 57 and engaging between ring 53 and the perifery of clutch-body 55, to move rolls 57 both circumferentially and radially outward along inclines 55C in hardened steel clutch-body 55 into their cooperating recesses 55B in said clutch-body to effect the positive locking of clutch-drum 52 to body 55 and shaft 42, so that forthwith there is established a positive driving linkage between fly-wheel 51 and drum 52 on the one hand and shaft 42 and shearing dies G, H on the other. Ring 53 is a hardened steel liner of overhanging cup 52B.

Thus the normally idle shear-shaft 42 intermittently is locked to the continuously rotating heavy fly-wheel driving-gear 51 for time intervals which are brief relative to the times of rest of 42; but each of such brief times is sufficient to allow a complete rotation of 42 and a complete shearing excursion of dies G and H to act on the traveling stock.

The means for turning basket 56 when the latter is released by cam 66A, detent 67 and plunger 69, is the helical spring 60, Figs. 5, 7 and 8, arranged around the outside of basket 56. One of its ends is anchored to plate 58, Fig. 8, and the other to basket-lug 56B. Spring 60 always tends to rotate basket 56 clockwise. Initially it is put under stress by the constructor who turns plate 58, to which one end of spring 60 is anchored, until the desired stress is produced and then a pin, not shown, is passed thru plate 58 and into one of the holes 107A, Fig. 19, to hold plate 58 against being moved radially by spring 60. Then nut 59 on the end of shaft 42, Fig. 5, is tightened against plate 58. The arrangement of spring 60 on the outside of basket 56 not only makes it easy of installation, adjustment and inspection but permits it to have a large diameter useful in acting quickly to turn basket 56 and lock drum 52 positively to clutch-body 55.

All the above initiation of rotation of shaft 42 by massive driver 51 and drum 52 occurs in a very short time indeed, very much shorter than the brief moment of rotation of shaft 42, and always in the same length of time for a given rate of stock-feed, i. e., between the instant of the tripping action of cam 66A on sliding detent 67 and the immediately subsequent instant when clutch-body 55 begins to rotate shaft 42 anti-clockwise to start the cycles of dies G, H from their normal positions of rest, Fig. 17. During the single complete rotation of shaft 42 which effects the complete horizontal excursion of G and H, the plunger 69, Fig. 19, has been moved upward in opposition to its spring 70 to resume its normal relatched or re-locked position in the path of the clockwise revolution of stop-nose 56B. This normal position of 69 is reached in advance of the complete revolution of said nose 56B and of the complete excursion of dies G and H; said relocking being effected substantially while the stock is being sheared. As soon as said nose 56B abuts against stop 69 lying in its path, the roll-basket 56 disengages locking-rolls 57 from their locking and driving positions between clutch-drum 52 and clutch-body 55 as above; and then clutch-body 55 and shaft 42, thereby disengaged from the positive drive via rolls 57, immediately come to rest under action of the braking means there to remain ready for the next single rotation of shaft 42 to effect the next shearing excursion of dies G and H after the continuous feed has advanced sufficient length of stock to require initiation of such next excursion of G and H, as determined by the operator's adjustment of wheel 65. The heavy fly-wheel drive 51 for clutch-drum 52 provides sufficient energy not merely to effect the horizontal excursions of dies G and H and the upward movement of H, but to insure the downward movement of H against the resistance of the more or less heavy stock undergoing shearing.

Spring 60 is re-wound as the result of the above operations of stopping the intermittent movements of clutch-body 55, shaft 42 and the shearing apparatus; in fact, spring 60 cooperates with brake 61 in bringing said parts to a quick stop. Just after plunger 69 is raised up in front of basket-nose 56B, i. e. while rolls 57 are moving from their locking positions, and before said shearing parts come to rest, there is a definite drift of said parts, i. e., about twenty degrees of rotation of shaft 42. Spring 60 is wound up by that drift; and that action assists in braking the parts.

*Shearing mechanism*

The construction and operation of the mechanism by which dies G and H are operated by clutch-shaft 42 are as follows, this involving what is termed herein the "aerial shear". The main base 36 for this light aerial shearing apparatus, Fig. 17, is fixed to heavy frame Q of the machine. The upper portion of base 36 is formed with ways or gibs 37 on which slides die-G-carrier F which moves (reciprocates) only in parallelism with the feeding movement of the stock, first to left and then back to rest at right. Carrier 34, shear-gate, for die H, mounted to slide vertically in the horizontally sliding die-G-carrier F is moved by clutch-shaft 42, which by means of the eccentric 39, Figs. 1, 8 and 17, splined to shaft 42 by 43, imparts to said carrier 34 a movement which is partly vertical, to move die H successively up, down and up, and partly horizontal to move slide F and dies G and H horizontally, first to left opposite to movement of stock and then back to right with the stock to normal positions of rest of the dies. The leftward shear-movement gives time for H to be raised for its downward hammer blow to shear the stock which occurs during the rightward movement of G and H and at a midpoint thereof when the dies moving in the same direction as the stock are moving also at substantially the same rate, i. e. during the instant after they have been accelerated to the stock-rate and before they begin to be decelerated.

Thru the upper part of die-H-carrier 34 extends for symmetry with shaft 42, an auxiliary shaft 40, Figs. 7 and 17, driven anti-clockwise by lower or clutch-shaft 42 via spur gears 44 fixed to 40, 45 fixed to 47, and 46 fixed to 42, Figs. 1, 5 and 7. These shafts 40 and 42 are journaled in bearings 36A of the main shear-carrier-support 36, Figs. 5 and 7.

The intermediate gear 45 which drives upper auxiliary shaft 40 and eccentric 38, is mounted to rotate on stud 47, Figs. 1, 5 and 7, fixed rigidly to stationary carrier-support 36. Upper or auxiliary shaft 40 is keyed by key 41, Fig. 17, to eccentric 38 which is a duplicate of eccentric 39 fixed to shaft 42. Thus the two eccentrics 38, 39 extending thru die-H-carrier 34 at top and bottom thereof respectively cooperate with one another, intermittently rotating synchronously anti-clockwise, in imparting symmetrically the desired single cycle of eccentric motion to 34, partly vertical and partly horizontal. The rear end of upper shaft 40 carries not only upper eccentric 38 but also a crank disk 90, Fig. 7, on which stud 91, Fig. 17, is mounted eccentrically to operate a pitman link 92 which operates the sheared sub-length discharging-apparatus, especially movable guide, Fig. 4, in a manner to be described later. Thus such discharging apparatus, in addition to the shearing apparatus, is operated thru slave L and the eccentric-shafts 42 and 40 all as timed by master K via cam 66A so that the cut stock is discharged substantially as soon as it has been sheared.

The operations of dies G and H will be understood best from the diagram of Fig. 18 in connection with Figs. 17 and 19–20. This diagram makes clear the operation of the eccentrics 39, 38 and the dies or shearing members during the single rotation of shaft 42 and of the eccentrics 38—39 by slave L, and particularly the relative vertical positions of G and H just before actual shearing (at A), at the time of shearing at B, and after that at C and D until the parts come to rest at three o'clock of the dial which represents at its center the shaft 42 and at its perifery the eccentric 39, the numerals of the dial corresponding to the various positions of the eccentric 39, during the rotation of shaft 42. The eccentrics, in the machine disclosed, have a throw of one and a quarter inches; that is, the distance of horizontal travel of the dies in each direction of their excursion is two and a half inches, i. e., between three and nine o'clock of the diagram dial. The horizontal distances between the vertical lines pendant from the numerals represent the varying rates of the horizontal movement of the dies resulting from the eccentric action of die-H-carrier 34. As above, in the three o'clock position of eccentrics 38, 39 relative to shafts 40, 42 respectively as centers, the dies are in their normal positions of rest, as shown in Fig. 17, with die H at a level slightly higher than G. When shaft and eccentrics begin to turn anti-clockwise from three to nine o'clock, Figs. 17–18, then both G and H are moved leftward, and during such leftward movement H begins at twelve o'clock to go down on its shearing stroke while both G and H yet continue leftward from twelve to nine o'clock. By nine o'clock H in its downward stroke has reached a vertical position which is the same as that of its normal position of rest, i. e., that shown in Fig. 17, three and nine o'clock, Fig. 19, a level somewhat higher than vertically-stationary die G, and higher than at A, Fig. 18. Also at nine o'clock both dies have reached the end of their leftward travel and commence the return trip of their horizontal excursion back to three o'clock; the reversal of direction taking place while H is going down and just prior to the vertical of H at position A and prior to the actual shearing which occurs at about seven-thirty, at which shearing time the dies are moving rightward at substantially the same rate as the stock; the rate of return rightward movement between nine and eight oclock being less than the rate of stock-travel as indicated by the horizontal distance between the vertical lines pendant from the dial numerals. As indicated by the first positions of the dies, at A, in Fig. 18 the two dies are about in horizontal alinement with one another as eccentrics 38–39 approach eight o'clock, and rapidly are continuing to gain horizontal speed left to right, as shown by the spaces between the vertical lines from the dial, before shearing altho the dies yet are moving slightly more slowly than the stock; die H continuing to do down alongside and across die G. As the die-eccentrics or offsets 38—39 have approached eight o'clock, A, Fig. 18, as above the die H has gone down to embrace the stock, its bottom being open, and its effective lower edge is about to be jammed down upon the stock to force (shear) off a sub-length along the vertical line between the adjacent dies. Between eight and seven o'clock the horizontal speed of the dies rightward is substantially the same as that of the stock rightward, and die H at about seven-thirty, B, Fig. 18, has gone down part-way across the stock and its effective lower edge has cloven or fractured and sheared the stock so that the sub-length at right being sheared already is being carried down by the movable stock-support J below described more clearly. At the instant of shearing, the dies G and H are moving rightwardly at the same rate as the stock, at B, about seven-thirty. Between eight and seven o'clock the vertical movement of H is of about the same extent as its horizontal movement. After the shearing the die H continues downward until at six o'clock, C, Fig. 18, it reaches its lowest position, both dies moving horizontally rightward between seven and five o'clock at a higher rate than the stock. At six o'clock while both dies are moving rightward at highest rate, die H starts moving upward and continues so to do, D, Fig. 18, until both dies cease their horizontal excursion at three o'clock at the end of their rightward movement and there assume their normal positions of rest shown in Fig. 17 where die H is at a level slightly above die G. The two dies always remain in relatively parallel vertical paths for shearing cooperation alongside one another.

Considering the above operations in terms of quadrants of the Fig. 18 dial, and of the vertical component of the movements of die H, the first quadrant of the revolution of eccentric 39 and resultant quadrant of die-excursion, three to twelve o'clock, raises die H from its normal or intermediate level of Fig. 17 to its highest level; the second and third quadrants, twelve to six o'clock, depress die H from its highest to its lowest level A, B, C, Fig. 18, including the shearing midway of the third quadrant; and the fourth quadrant, six to three o'clock, D, Fig. 18, raises die H from its lowest level to its intermediate level or normal position of rest of Fig. 17. As to the horizontal movements of both dies, the first two quadrants, three to nine o'clock, move them leftward and the second two quadrants, nine to three o'clock, move them rightward back to rest. During the leftward movements of the two dies the die H is raised from normal or intermediate level to highest level and back down to normal level; and during rightward movement, with the stock, the die H is moved down the rest of the way and back up to normal level for rest. The downward movement of die H occurs thruout the second and third quadrants, twelve to six o'clock, i. e., during the time when the two dies are executing the second half of their leftward movement and are reversing and moving thru the first half of their return rightward movement; altho the stock actually is not engaged by die H under the impulse of the fly-wheel 51 until after the dies have commenced their rightward return. Altho the parts of the shear including die H are of low mass yet ample shearing power is applied to the metal stock because behind H is the large moment of inertia of heavy fly-wheel 51 and clutch-drum 52, Fig. 19, backed by their positive drive by main shaft T rotated directly by belt R of main-driver P.

The actual stock-shearing takes place practically instantaneously i. e., during only a portion of the very brief time while the lower edge of the solid upper part of die H is passing, B, Fig. 18, downwardly across the right-hand end of the stock-opening thru hollow die G; said total downward movement of said lower edge of die H being while the eccentrics 38, 39 in their anti-clockwise revolution are passing from their eight to seven o'clock positions.

Thus the practically instantaneous shearing action occurs when stock-path-crossing tool H is about mid-way between 9 and 6 o'clock, i. e., when it is within approximately one-quarter revolution of its extreme position of movement vertically, i. e. of movement, (when as usual the stock is moving horizontally), in the direction across the stock-path. The tool-carriers are arranged relative to the stock-path, as shown, so that the above operation is insured, by locating the center of revolution of the revolving tool so that the shearing action is effected as stated above.

After the shearing has been completed and die H has gone down further to its lowest position at C, Fig. 18, said lower edge of die H instantly is raised, as the eccentrics turn further beyond their six o'clock positions anti-clockwise toward their three o'clock positions, so as to raise die H clear of the forward end of the stock next to be sheared which end lies in or near the right-hand end of the stock opening of G. This clearing of die H from the path of the continuously fed stock occurs relatively long before the rightward movement of the dies is stopped by the engagement of clutch-nose 56B, Fig. 19, against stop 69 in the anti-clockwise revolution of said nose, and by the action of brake 61—62; because said clearing occurs very shortly after die H starts to move up from its lowest position at C, Fig. 18, six o'clock, owing to the fact that the effective lower edge of H is only slightly below the die G opening even in said lowest position of H, so that the earlier part of the last quadrant, six to three o'clock, raises said lower edge of H above the die G opening, so that before H climbs to its normal or intermediate level, Fig. 17, its lower edge is far above the die G opening as is shown at D, Fig. 18. Furthermore, from a point just to left of seven o'clock, just after the actual shearing, to a point just to right of five o'clock, about when clearance of die H has occurred, the dies are moving rightward at a faster rate than the uncut stock, see distance between pedant lines from dial-numerals, so that the van of the stock to be cut does not catch up with the left of die H while it is being raised for clearance until at least after H has slowed down in its final movement upward and rightward toward its position of rest after the occurrence of clearance.

*Cut-stock receiving means*

This includes, right, Figs. 1 and 2, two uprights N positioned on longitudinal member 81 having flange 82 secured to bed-casting Q of the machine. Additional stiffening means between the two uprights N, N consists of longitudinal dead shaft 83; and this is a strong support for the right-hand one of the two stock receivers O, O, Figs. 2–3. Two stock-guides, viz., I, stationary, and J, movable, are supported by uprights N. I is secured, Fig. 4, to the overhanging goose-neck tops N' of uprights N. J is pivoted to front and rear lowering-arms 84, Figs. 1–4, 5, 8, 17, by means of upper pivot studs 85. Front lowering arm 84 is mounted pivotally on stud 87, Figs. 2–3. Rear lowering arm 84 and operating lever 89 are mounted on stud shaft 88, Fig. 1.

Movable guide J is formed with stock-groove 86, Fig. 4, on its side adjacent stationary guide I, groove 86 extending from end to end of J. As the stock is fed rightward from the shearing mechanism its forward portion is received between guides I and J.

*Stock-discharging mechanism*

As soon as the shearing mechanism cuts off the front end of the stock, but before drum 52 of slave L is disconnected from shaft 42, guide J is moved on its pivots 85 in a downward sweeping arc generally parallelling the downward movement of die H and its carrier 34, the sheared short length of stock in groove 86 being moved by J until they both pass below and beyond the lateral restraining effect on the stock of stationary guide I; then the stock drops down out of groove 86 and falls in the trough formed by arms M of the receiving racks N and O. That downward movement of guide J takes place forthwith upon the stock-shearing, see B, Fig. 18. Spring 94, Fig. 17, thereupon lifts J back to its normal position against the ledge N¹ of upright N and adjacent stationary guide I.

Said downward movement of guide J to discharge the sheared stock is effected by the following mechanism, Fig. 17, starting from the above mentioned stud 91 eccentrically mounted on crank disk 90 carried by shaft 40 in the top of carrier 34, Figs. 7 and 17. The revolution of eccentric stud 91 acts thru pitman link 92 to discharge the cut stock, from its confinement as above betwen guides I and J in groove 86, as soon as the shearing is done, i. e., when eccentrics 38, 39 are moving from eight to seven o'clock, Fig. 18, during the rightward movement of the dies, carrier 34 and link 92. Since disk 90 is fixed to shaft 40, the stud 91 revolves once for each operation of slave clutch L, i. e., once for each excursion of the shearing dies, as in the case of the revolution of master-cam 66A, Fig. 5, save that it is the initiation of the excursion of the shearing dies which is caused by said cam, whereas stud 91 acts later to discharge the cut stock at about the time of completion of the actual shearing. The mounting of guide J, which is moved by the above connections 40, 90–92, is by the two front and rear lowering arms 84, Figs. 1, 3, 5, 8, 17; the front arm being pivoted on stud 87, Figs. 2 and 3, and the rear arm being fixed to stud-shaft 88 to which also is fixed an operating lever 89 which connects link 92 to pivoted front lowering arm 84. Thus guide J can be swung downwardly on front pivot 87 and on rear stud-shaft 88 to free the cut length of stock for its discharge by gravity, such movement of J, Fig. 17, being caused by the clockwise movement of 89 by link 92 at about the instant when H has completed its downward shearing stroke in the seven-thirty o'clock position, Fig. 18, of eccentrics 38, 39 relative to their shafts 40, 42. The right end of link 92 is slotted at 92A, Fig. 17, so that after clutch L first starts to turn anti-clockwise the shafts 40, 42, and the disk 90 and stud 91, said link 92 reciprocates freely without operating the lever 89. Later, when eccentrics 38, 39 are at about seven-thirty o'clock, Fig. 18, the left end-wall of the slot 92A engages stud 93 of operating lever 89 and pushes it rightward to swing 89 clockwise on pivot 88 stretching return-spring 94 and depresses guide J by swinging 84 down; this action taking place when eccentric stud 91 is moving anti-clockwise from about four-thirty to three o'clock relative to shaft 40 after its anti-clockwise revolution from its position of rest in Fig. 17; eccentrics 38, 39 during the depression of guide J moving from about seven-thirty, Fig. 18, to six o'clock, at which latter time, the operating lever 89 is substantially vertical and guide J is depressed fully. Then as eccentrics 38, 39 move from six to three o'clock, stud 91 is moved from three to twelve o'clock, its position of rest in Fig. 17, and the left wall of the slot 92A in 92 is moved leftward leaving 89 free to be swung to left by spring 94 into its position of rest in Fig. 17, thereby raising guide J up alongside guide I in position to receive in groove 86 in J the stock continuously moving from the left. The depression of guide J is only for an instant and this guide is raised fully by spring 94 by the time there is any projection of the van of the stock to be sheared beyond die H to the right.

Cocking mechanism

The above assumes the return of stop-plunger 69 up to its normal position of Figs. 19–20 during, before the end of, the above excursion of dies G, H. This assumed operation is effected as follows, by an action of automatic re-latching or re-cocking of slave clutch L in preparation for the firing of die H down at the stock by means of said clutch when the trigger, detent 67, is pulled by the operation of master K and its cam 66A. This re-cocking is effected by the above downward movement of die-H-carrier 34, twelve to six o'clock, Fig. 18, prior to final upward movement of 34 which raises die H into its normal position of rest shown in Fig. 17. Such downward movement of carrier 34 effects the upward return movement of stop 69 by the following mechanism. On the lower end of carrier 34 is fixed a wearing-plate 75, Figs. 17, 7 and 20, which engages with roll 76 journaled in the bifurcated upper end of spring-cushioned plunger 77 reciprocating thru bearing $Q^1$, Fig. 17, in stationary part Q of the machine frame or bed-casting. The lower end of plunger 77 is slotted, Fig. 20, at 77A and a cross-stud 79 engages in said slot, being fixed in the left end of lever 78; lever 78 being intermediately mounted pivotally on short shaft 80 turning, Fig. 20, in a bearing member $Q^2$ secured to machine-bed Q; and the right end of lever 78 engages the lower end of clutch-stop 69. By this time master-cam 66A has let go of detent 67, Fig. 19, and spring 68 has forced 67 rightward against plunger 69; spring 60 standing by to push 67 further rightward into the locking recess in 69 as soon as upward movement of 69 carries said recess up into the horizontal path of 67. So, when die-H-carrier 34 goes down, from twelve to six o'clock, Fig. 18, the upper wall of slot 77A in plunger 77 engages stud 79 to swing the left end of 78 down on its pivot 80 to lift clutch-stop 69, stretching spring 70, in position in front of nose 56B and allow spring 68 to push detent 67 into the locking recess in 69; and later, when nose 56B abuts stop 69 at the end of the effective rotation of L and of the excursion of dies G and H, then the locking-rolls 57 of the clutch are moved from their driving positions, and drum 52 of clutch L thereby is disconnected from clutch-shaft 42 which constitutes the drive for G and H. Detent 67 in said position locking stop-plunger 69 is ready to be retracted later by master cam 66A at the proper time to cause clutch L again to operate dies G and H via shaft 42. Slot 77A in 77 permits the final raising of 34 and H, six to three o'clock, Fig. 18, without disturbance of the previously effected re-cocking.

Clutch L may be tripped manually by the operator to cause shear-operation on the crop end of each long piece of stock entering the machine; and any desired mechanism can be employed for this purpose in addition to the automatic tripping mechanism shown.

Summing up the above shearing operations at the right of the machine in chronological order, starting from the state of rest in Figs. 17, 19–20 at the three o'clock positions of cams or eccentrics 38, 39 in Fig. 18, master cam 66A has a rate of revolution which is predetermined by the setting of graduated wheel 65 to have a definite desired relation to the rate of stock-feed; and said cam first trips slave-clutch L to initiate the operation of the aerial shear including dies G, H. Then, just before die H reaches its lowest position, six o'clock, Fig. 18, and during the shearing the stock-guide J containing the sheared-off stock-length is moved down by 90—93 to discharge said length whereupon J immediately is raised to normal by spring 94. And after said master-cam 66A has been revolved beyond detent 67, and while die H yet is moving down in its shearing stroke, twelve to six o'clock, Fig. 18, the die-H-carrier 34 by its downward movement causes re-cocking of clutch L not only to prepare thereby to stop the shear operation but also to put the parts in condition for the next tripping of the clutch by master cam 66A after the feed of uncut stock has continued to the desired extent as determined by the adjustment of adjustable speed mechanism K by wheel 65. And finally, with stop 69 in the path of the moving stop-nose 56B, Fig. 19, the clutch L and its shaft 42 operate thru their last quadrant, six to three o'clock, Fig. 18, to move dies G and H thru the latter half of their rightward stroke whereupon nose 56B abuts stop 69 to disconnect clutch-drum 52 and fly-wheel 51 from shaft 42; and thereupon brake 61—62 with the re-winding of spring 60 stops the motion of the shear-parts driven by L at their normal positions of rest of Figs. 17, 19–20, i. e., at three o'clock, Fig. 18.

The relative rates of travel of the continuously fed stock and the intermittently moving shear are coordinated ultimately by the amount of eccentricity of cams 38, 39; after general determination of such rates by the power-connections from motor P and shaft T to feed-rolls C and C' via standard gear-reduction units W and Z respectively and to clutch-shaft 42 via pinion 50 and fly-wheel gear 51. With the above-described eccentric-throw of one and one-quarter inches for cams 38, 39, a desirable rate for clutch-shaft 42 and said cams is 175 R. P. M. with a stock-feed by rolls C, C' of about seventy-five feet per minute; this for the rod, tube, or wire machine disclosed; the rate of horizontal movement of die-G-carrier F at the instant of shearing, B, Fig. 18, being substantially the same as the horizontal movement of the stock. Thus, in any case, intermittent action of the shear involves its practically instantaneous conversion from a state of absolute rest to a rate of movement of from at least about a foot per second,—an operation entirely practical with the arrangements including the light aerial shear-parts and the relatively heavy continuously operated clutch parts above discussed and specified in the following claims.

I claim:

1. In a long stock fabricating machine, the combination with stock-feeding mechanism; of a fabricating tool reciprocable both in line with the direction of stock-feed and simultaneously to and from the moving stock; a member reciprocable in line with the direction of long-stock feed; a second member movable with the first and simultaneously additionally reciprocable to and from the moving stock; revolvable eccentric mechanism reciprocating said second member; said reciprocating members being relatively arranged to cause the reciprocation of the second member to reciprocate the first; said fabricating tool being mounted to participate in the directions of reciprocation of both said members; a uniformly-acting positive-locking clutch having an element normally disconnected from said eccentric mechanism; a constantly-rotating fly-wheel continuously driving said clutch element; and mechanism intermittently tripping the clutch and fly-wheel to cause revolution of said eccentric mechanism at desired times.

2. In a long stock fabricating machine, the combination with continuously operating stock-feeding mechanism, of an intermittently operating fabricating tool reciprocable both in line with the direction of stock-feed and simultaneously to and from the moving stock; a member reciprocable in line with the direction of long-stock feed; a second reciprocable member movable with the first and also simultaneously reciprocable to and from the moving stock; said fabricating tool being mounted to participate in the movements of said second reciprocable member; the reciprocating members being cooperatively arranged relative to one another to cause the reciprocation of the second member to effect reciprocation of the first thereby keeping the second and said tool free for their said double reciprocation; revolvable eccentric mechanism on which said second reciprocable member is mounted whereby the said double reciprocation is imparted to said fabricating tool; continuously driven means for revolving said eccentric mechanism at a rate coordinated with the rate of said stock-feeding mechanism but normally disconnected from said eccentric mechanism; tripping mechanism intermittently causing connection of the eccentric mechanism to its said revolving means; and a master effecting intermittent operation of said tripping mechanism at times coordinated with the feed of the long stock by said feeding mechanism.

3. In a long stock fabricating machine, the combination with continuously operating stock-feeding mechanism, of an intermittently operating fabricating tool reciprocable both in line with the direction of stock-feed and simultaneously to and from the moving stock; tool-carrying mechanism including two reciprocable members of which one is movable in line with the direction of long-stock feed and the other of which is movable to and from the moving stock, one of said members being reciprocable with the other but free for its own reciprocation, and connected with the fabricating tool to cause said reciprocations thereof; normally stationary mechanism intermittently effecting reciprocation of said doubly-reciprocable tool-carrying member causing said combination of the latter with the other reciprocable member to effect the reciprocation of said other reciprocable member, said mechanism effecting such reciprocation being normally at rest, and during most of the time of stock-feed said reciprocable members and fabricating tool also being then at rest; and mechanism intermittently causing said reciprocating mechanism to become operative at desired times.

4. In a long stock fabricating machine, the combination with continuously operating mechanism feeding the long stock horizontally, of an intermittently operating fabricating tool reciprocable both horizontally and simultaneously vertically; tool-carrying mechanism including two members of which the first is reciprocable horizontally and the second of which is reciprocable horizontally together with the first and also simultaneously but independently reciprocable vertically and connected with the fabricating tool to cause said horizontal and vertical reciprocations thereof; normally stationary mechanism intermittently reciprocating said second or doubly-reciprocable member causing its said combination with the first reciprocable member to effect the reciprocation of the latter and the tool at a rate coordinated with the rate of said stock-feeding mechanism; said reciprocation-producing mechanism normally during the operation of the machine being inoperative, said reciprocable members and fabricating tool also being then at rest; and mechanism automatically and intermittently causing operation of both said reciprocable members at desired times by means of said reciprocation-producing mechanism.

5. In a long stock shearing machine, the combination with stock-feeding mechanism, of two cooperating shearing tools, the first of which is reciprocable in line with the direction of long-stock feed and the second of which is movable with the first and simultaneously reciprocable also to and from the moving stock; two tool-carriers respectively for said shearing tools, each mounted for reciprocation in correspondence with its tool; revolving eccentric mechanism normally at rest but intermittently effecting reciprocation of said second carrier; said carriers being in mechanical relation to one another causing the first carrier to be reciprocated by the reciprocation of the second carrier; means intermittently revolving said eccentric mechanism at a rate coordinated with the rate of said stock-feeding mechanism; and tripping mechanism automatically and intermittently causing operation of said revolving means at desired times.

6. In a long stock shearing machine, the combination with continuously operating stock-feeding mechanism, of two intermittently operating co-operating shearing tools; two tool-carriers for said tools respectively the first carrier being reciprocable in the machine in line with the direction of long-stock feed and the second carrier being movable with and reciprocable thru said first carrier in a direction to and from the moving stock; eccentric mechanism intermittently moving said carrier and thereby the first carrier thru which it moves, but idle during most of the time of stock-feed; driving mechanism normally disconnected from said eccentric mechanism but in continuous operation at a rate coordinated with the rate of the continuously operating stock-feeding mechanism; and tripping mechanism intermittently automatically causing operation of said eccentric mechanism at desired times by said driving mechanism.

7. In a long stock shearing machine, the combination with continuously operating stock-feeding mechanism, of two intermittently operating and cooperating shearing tools; a member reciprocable in line with the direction of long-stock feed and carrying one of said shearing tools; a second similarly reciprocable member also movable across the path of the moving stock; two synchronously revolvable but normally stationary eccentrics on which said second reciprocable member is mounted; said two reciprocable members being arranged relative to one another to cause the reciprocation of the second member by the eccentrics to effect the reciprocation of the first member; the second shearing tool being mounted to participate in the reciprocations of both said members; intermittently operating mechanism revolving said two eccentrics at a rate coordinated with the rate of said continuously operating stock-feeding mechanism; and a master causing occurence of said intermittent operation of said revolving means at times coordinated with the feed of the long stock by the feeding mechanism.

8. In a long stock fabricating machine, the combination with continuously operating stock-feeding mechanism, of intermittently operating fabricating mechanism reciprocable in line with the direction of long-stock feed and including a fabricating tool movable also across the path of the moving stock; two parallel rotatable shafts; two eccentrics arranged to be revolved by said shafts respectively; mechanism operated by said eccentrics and effecting single excursions of said fabricating mechanism and said tool for each rotation of said shafts; mechanism initiating synchronous rotation of both said shafts at times coordinated with the feed of the stock by said feeding mechanism and at rates coordinated with the rate of said feeding mechanism; and mechanism stopping said shafts at the end of single rotations thereof.

9. In a shearing machine for long rods and wires, the combination with continuously operating stock-feeding mechanism, of two intermittently operating and cooperating shearing dies; two die-carriers for said dies respectively, the first carrier being reciprocable in the machine in line with the long-stock feed and the second carrier being movable with the first carrier and movable therethru in a direction across the path of moving stock; eccentric mechanism on which said second carrier is mounted; driving mechanism intermittently effecting a single revolution of said eccentric mechanism at a rate coordinated with the rate of said continuously operating stock feeding mechanism; and mechanism controlling the times of operation of said driving mechanism in coordination with the stock-feed.

10. In a long stock fabricating machine, the combination with continuously operating stock-feeding mechanism, of fabricating means intermittently reciprocable in line with the direction of stock-feed and simultaneously movable across the path of the moving stock; a roll-locking clutch causing said intermittent operation of said fabricating means; said clutch having a member continuously rotating at a rate coordinated with the rate of said stock-feeding mechanism; a common power source operating both said clutch-member and said feeding mechanism; and a master controlling the roll-lock of the clutch in coordination with the feed of the stock.

11. In a long stock fabricating machine, the combination with continuously operating stock-feeding mechanism, of intermittently-acting fabricating mechanism reciprocable in line with the direction of stock-feed and simultaneously movable across the path of the moving stock at rates coordinated with the rate of said stock-feeding mechanism; a roll-locking clutch arranged to effect such intermittent operation of the fabricating mechanism; and a master controlling the roll-lock of said clutch in coordination with the feed of the stock.

12. In a long stock fabricating machine, the combination with continuously operating stock-feeding mechanism, of intermittently-acting fabricating mechanism including a fabricating tool; a continuously-driven uniformly-acting and positive-locking clutch arranged to drive the fabricating mechanism and tool intermittently at rates coordinated with rate of the stock-feeding mechanism said clutch including a member rotatable to effect driving connection of the clutch with the fabricating mechanism; a helical spring mounted exteriorly on and concentric with said rotatable clutch-member in condition normally tending to rotate the same; stop-mechanism normally preventing rotation of said clutch-member; a master intermittently causing operation of the stop-mechanism freeing said clutch-member for rotation by said spring at times coordinated with the feed of the stock; and mechanism restoring the normal position of the stop-mechanism and causing rewinding of said spring for succeeding actions, such rewinding acting as a brake on the fabricating means during the operation of disconnection of the clutch.

13. In a long stock fabricating machine, the combination with continuously operating stock-feeding mechanism, of intermittently-acting fabricating means including a fabricating tool; mechanism intermittently operating said fabricating means and tool at rates coordinated with the rate of said stock-feeding mechanism; a rotatable driver of said reciprocating operating mechanism normally disconnected therefrom during the stock-feed; a spring tending to effect connection of said rotatable driver with said operating mechanism; means normally opposing said tendency of said spring; a master intermittently freeing said spring for connection of said driver to said operating mechanism for at times coordinated with the feed of the stock by said feeding mechanism; mechanism causing disconnection of the driver from said operating mechanism; and a brake stopping the operating mechanism and the fabricating means upon such disconnection.

14. In a long stock shearing machine, the combination with continuously operating stock-feeding mechanism, of gearing driving it and a longitudinal shaft driving said gearing; a main driver; a belt from said main driver and driving said shaft; a bevel gear on said shaft; a transverse shaft; a bevel gear and a connected uniformly-acting, positive-locking clutch both on said shaft but normally idling thereon, said bevel gears intermeshing; fabricating mechanism driven from said transverse shaft and including two shearing members both reciprocable in line with the direction of stock feed and one simultaneously movable across the path of the continuously fed stock, and both operated by said shaft at rates coordinated with the rate of said stock-feeding mechanism; tripping mechanism intermittently effecting operative connection of the clutch with its said transverse shear-operating shaft; a master causing said intermittent operation of the tripping mechanism at times coordinated with the feed of the long stock by said feeding mechanism; and mechanism operated by said main driver and causing operative disconnection of the clutch from its said transverse shear-operating shaft.

15. In a long stock shearing machine, the combination with continuously operating initial stock-feeding mechanism, gearing driving it and a longitudinal shaft driving said gearing; a main drive; a belt from the main driver driving said longitudinal shaft; a bevel gear on said shaft; a transverse shaft; a bevel gear and a connected uniformly-acting, positive-locking clutch both on said shaft but normally idling thereon, said bevel gears intermeshing; intermittently operating fabricating mechanism driven from said transverse shaft and including two shearing members both reciprocable in line with the direction of stock feed and one also simultaneously movable across the path of the continuously fed stock; auxiliary stock-feeding mechanism continuously operating and located between the initial feeding mechanism and the fabricating mechanism; both said stock-feeding mechanisms and said shearing members having rates of movement coordinated with one another; operative connection of the clutch with its said transverse shear-operating shaft; a master causing said intermittent operations of the tripping mechanism at times coordinated with the feed of the long stock by said feeding mechanisms; and mechanism operated by said main driver and causing operative disconnection of the clutch from said transverse shear-operating shaft.

16. In a long stock shearing machine, the combination with continuously operating stock-feeding mechanism, of gearing driving it and a longitudinal shaft driving said gearing; a main driver; a belt from the latter and driving said longitudinal shaft; a bevel gear on said shaft; a transverse shaft; a bevel gear and a connected uniformly-acting positive-locking clutch both on said shaft but normally idling thereon, said bevel gears intermeshing; fabricating mechanism intermittently driven by said shaft at rates coordinated with the rates of said stock-feeding mechanism and including two inter-related shear-carriers having the shearing members respectively mounted thereon, both said shear-carriers being reciprocable in line with the direction of stock-feed and one of them being also simultaneously movable across the path of the continuously fed stock; eccentric mechanism revolved by said transverse shaft, one of said shear-carriers being mounted on said eccentric mechanism; tripping mechanism intermittently effecting operative connection of said clutch with its said transverse shear-operating shaft; a master causing said intermittent operation of the tripping mechanism at times coordinated with the feed of the long stock by the feeding mechanism; and mechanism operated by said main driver and causing operative disconnection of the clutch from its said transverse shaft.

17. In a long stock fabricating machine, the combination with continuously operating stock-feeding mechanism feeding the long stock lengthwise in a straight line, of intermittently operating fabricating mechanism including a fabricating tool reciprocable in line with the direction of long-stock feed, said fabricating tool being also movable simultaneously across the path of the continuously moving stock; mechanism intermittently effecting such movements of said fabricating mechanism and said tool at rates coordinated with those of said stock-feeding mechanism, said mechanism including eccentric mechanism connected to said tool and normally stationary in substantially three o'clock position relative to its center of revolution on the assumption that said straight line feed of the stock is from nine to three o'clock; and driving mechanism intermittently effecting a single complete anti-clockwise revolution of said eccentric mechanism from its said three o'clock position whereby the fabricating tool first is moved opposite to the direction of stock-feed while being first moved away from the stock and its normal position and then moved back to normal and toward the stock, and then its movement opposite to the stock-feed is reversed and it is moved in the same direction as the stock feed while being first moved from normal toward and across the moving stock and then moved back to normal and out of the path of the moving stock before the rate of the tool in the direction of stock-feed becomes less than that of the stock.

18. In a long stock shearing machine, the combination with continuously operating stock-feeding mechanism, of intermittently operating shearing tools both of which are reciprocable in line with the direction of long-stock feed, one of them being also movable simultaneously across the path of the moving stock; revolving eccentric mechanism intermittently effecting such movements of both tools, said eccentric mechanism normally being stationary in substantially three o'clock position relative to the center of revolution on the premise of the stock being fed along a straight line from nine to three o'clock; and driving mechanism intermittently effecting a single complete anticlockwise revolution of said eccentric mechanism from its said three o'clock position whereby the two shearing tools first are moved opposite to the direction of stock-feed while one of them is first moved away from the stock and its normal position and then moved back to normal and toward the stock, the movement of the two tools opposite to the stock-feed then being reversed to the same direction with the stock-feed while one of them first is moved from normal toward and across the stock and then moved back to normal and out of the path of the moving stock before the rate of the tool in the direction of stock-feed becomes less than that of the stock.

19. In a long stock shearing machine, the combination with stock-feeding mechanism, of intermittently-acting shearing mechanism including two shearing tools reciprocable in line with the direction of long-stock feed, one of said tools being simultaneously reciprocable also to and from the moving stock; mechanism effecting such reciprocations of said tools; mechanism receiving the advanced portion of the stock fed beyond said shearing mechanism; and discharging mechanism connected between the shearing mechanism and receiving mechanism and moving the latter to discharge the sheared advance end of the stock.

20. In a long stock fabricating machine, the combination with continuously operating stock-feeding mechanism, of intermittently operating fabricating mechanism reciprocable in line with the direction of long-stock feed and including a fabricating tool simultaneously movable also across the path of the moving stock; mechanism intermittently effecting such tool-movements; a drive-shaft mounted transversely of the machine and operating said tool-moving mechanism; a main driver; connections with the feeding mechanism continuously operated by the main driver; a roll-locking clutch between the main-driver and said transverse drive-shaft; and means intermittently causing operative connection of the main driver with the drive-shaft by way of said clutch and therefore operating the fabricating mechanism at times coordinated with the movement of the stock by said feeding mechanism; the rates of said intermittently operating transverse shaft, tool-moving mechanism, fabricating mechanism and tool being coordinated with those of said continuously operating stock-feeding mechanism.

21. In a long stock fabricating machine, the combination with continuously operating stock-feeding mechanism, of an intermittently operating fabricating tool reciprocable in line with the direction of long-stock feed and simultaneously movable across the path of the moving stock; driving mechanism; mechanism normally operating the feeding mechanism by the power of said driving mechanism; mechanism operating said fabricating tool; a uniformly-acting clutch having two movable members, the first connected to said tool-reciprocating mechanism and continuously tending to be driven by the second member and the second member being continuously driven by said driving mechanism; a stop carried by and movable with the second clutch-member; a second movable stop normally lying in the path of the first stop and opposing the tendency of the first clutch-member to be operated by the second clutch-member; and a master coordinated with the long-stock feed and causing movement of the second stop intermittently from the path of the first stop thereby effecting operation of the fabricating tool at desired times relative to the feeding movement of the stock.

22. In a long stock fabricating machine, the combination with continuously operating stock-feeding mechanism, of an intermittently operating fabricating tool reciprocable in line with the direction of long-stock feed and simultaneously movable also across the path of the moving stock; driving mechanism; mechanism normally operating the feeding mechanism by the power of said driving mechanism; mechanism imparting said movements to the fabricating tool; a uniformly-acting clutch having two moving members, the first connected to said tool-moving mechanism and normally movable by the second and the second continuously driven by said driving mechanism; a stop carried by and movable with the second clutch-member; a second movable stop normally lying in the path of the first stop and preventing operation of the first clutch-member by the second clutch-member; rotatable master mechanism; an eccentric revolved by said master mechanism and controlling the time of movement of said second movable stop from the path of the first stop; and mechanism restoring the normal locking relation of said stops upon completion of the fabricating operation.

23. In a machine for shearing long stock, the combination with stock-feeding mechanism including two pairs of pinch-feeding rolls and a plurality of staggered auxiliary feed rolls located intermediate said pairs of pinch-rolls; of two shearing tools both reciprocable in line with the direction of stock-feed thru said three sets of feed rolls and one movable across the path of the moving stock; a power source; connections driving said three sets of feed rolls by the power of said source; a normally idle shaft; mechanism positively connected between said shaft and said shearing tools and effecting said movements thereof; a uniformly-acting clutch and gear normally rotating idly on said shaft; means continuously driving said gear by the power of said source at a rate coordinated with the rate of said positively driven feed rolls; said clutch including two elements of which the first is associated with said gear and constantly tends to drive the second and the second is fixed to said shaft; stopping means normally preventing rotation of the second clutch element; and master mechanism intermittently operating said stopping means causing said clutch to drive said shaft and tool-moving mechanism for shearing at desired portions of the length of the long stock.

24. In a long stock fabricating machine, the combination with continuously operating stock-feeding mechanism, of an intermittently operating fabricating tool reciprocable in line with the direction of stock-feed and simultaneously movable also across the path of the moving stock; driving mechanism; mechanism effecting said continuous operation of the feeding mechanism by the power of said driving mechanism; mechanism imparting said movements to the fabricating tool; a uniformly-acting clutch having two elements the first connected to said tool-moving mechanism and the second driven by the power of said driving means; while the latter operates said feeding mechanism; said second clutch-member constantly tending to drive the first clutch-member; a stop carried by and movable with the first clutch element; a second movable stop tending to move out of the path of the first stop; opposing mechanism moving said second stop into said path; tripping mechanism and means normally holding the same in locking engagement with the second stop when the latter lies in the path of said first stop; and master mechanism intermittently unlocking said tripping mechanism from the second stop and freeing the latter for its movement out of said path.

25. In a long stock fabricating machine, the combination with continuously operating stock-feeding mechanism, of an intermittently operated fabricating tool mounted on the machine for reciprocation in line with the direction of long-stock feed and simultaneously movable across the path of the moving stock; solid mechanical operating connections effecting said tool movements; driving means; solid mechanical operating connections between the driving means and respectively the feeding mechanism and said tool-operating connections; said connection between the driving means and the tool-operating connections including a clutch having two elements of which the first is connected to the driving means and constantly tends to drive the second, and means normally preventing such clutch-drive; and solid mechanical connections intermittently operating said preventing means successively causing operative connection of the driving means with and operatively disconnecting it from said tool-operating connections.

26. In a long stock shearing machine, the combination with continuously operating stock-feeding mechanism; of cooperating shearing members both intermittently reciprocable in a direction in line with the long-stock feed and one simultaneously movable also across the path of the moving stock; eccentric mechanism effecting such shear-operation; mechanism intermittently operating said eccentric mechanism; mechanism intermittently discontinuing such eccentric operation; sheared-stock-discharging mechanism operated by said eccentric mechanism; and mechanism also connected with said eccentric mechanism and operating said discontinuing mechanism.

27. In a machine for fabricating long relatively narrow stock, the combination with a main driver for such machine supported within the same as a whole; a main shaft extending longitudinally of the machine; a multistrand belt between said main driver and main shaft; a roll-stand including rolls for initial stock-feeding; gearing operated by said main shaft and positively driving said rolls; fabricating mechanism including a tool reciprocable in line with the direction of long-stock feed and simultaneously movable also across the path of the moving stock; auxiliary stock-feeding means between the roll-stand and the fabricating mechanism; gearing operated by said main shaft and positively driving said auxiliary feeding means; a transverse shaft; an interconnected clutch and gear normally rotating idly on said transverse shaft and driven by the main shaft; and fabricating mechanism operated by said transverse shaft and imparting the above-described operation to the fabricating tool.

28. In a machine for fabricating long metal stock supplied in the form of heavy rolls, the combination with intermittently operated stock-fabricating mechanism; of a reel for the stock-roll; a plurality of pairs of rolls located between the stock-reel and the fabricating mechanism feeding the stock from the reel to the fabricating mechanism; a driving shaft; a worm-gear reduction-unit operated by said shaft; vertical spindles for said rolls continuously operated by said reduction-unit; said rolls being mounted horizontally on said spindles, the rolls of each pair lying on opposite sides of the line of stock-feed, and the rolls and spindles on one side of said line being horizontally adjustable to and from the stock by the operator from the side of the machine; and a reel-support having a mounting on a base in fixed relation to the fabricating mechanism and feed-rolls, the position of said support locating the reel in a horizontal position in operative relation to said horizontal feed rolls.

29. In a long stock fabricating machine, the combination with continuously operating initial stock-feeding mechanism, of an intermittently operating stock-fabricating tool both reciprocable in line with the direction of long-stock feed and simultaneously movable across the path of the moving stock; continuously operating auxiliary feeding mechanism between the inital stock-feeding mechanism and the fabricating tool; and mechanism driving said three elements and including positive gear drives with worm-gear reduction units respectively operating said initial and auxiliary feeding mechanisms, a continuously rotating clutch, and mechanism intermittently connecting the clutch with the fabricating tool.

30. In a long stock, fabricating machine, the combination with continuously operating stock-feeding mechanism, including a plurality of feed-rolls and operating-spindles therefor, of an intermittently operating fabricating mechanism including a fabricating tool reciprocable in line with the direction of long-stock feed and also simultaneously movable across the path of the moving stock; mechanism intermittently effecting such tool-movements; and mechanism including a positive gear drive including a gear-reduction unit and connected to operate said feed-roll-spindles continuously.

31. In a long stock fabricating machine, the combination with continuously operating stock-feeding means including a plurality of vertical spindles and pinch-feed-rolls respectively mounted thereon; of fabricating mechanism including a tool reciprocable in line with the direction of stock-feed by said rolls and also simultaneously movable across the path of the stock moved by the rolls; mechanism normally continuously rotating said feed-roll spindles positively; mechanism operating said fabricating tool intermittently; and a common source of power for said spindle rotating mechanism and said tool-operating mechanism; said tool-operating mechanism including a self-connecting clutch; means normally preventing self-connection of the clutch; and a master intermittently operating said preventing means causing operation of the tool-operating mechanism.

32. In a machine for fabricating long metal stock supplied in the form of heavy coils, the combination with a machine frame, a reel for supporting such a stock-coil, of stock-fabricating mechanism mounted in said frame; a reel-support having a mounting in said frame in fixed relation to the fabricating mechanism and normally supporting the reel and its stock-coil in operative relation thereto; a roll-stand adjacent the operating position of the stock-reel, also mounted in said frame and including stock-feed pinch-rolls and auxiliary feed rolls; said mounting of the reel-support being pivoted and the reel-support carrying an empty reel swinging from its said operating position to a different position for more convenient reception of a heavy stock-coil to be fabricated; and said pinch feed-rolls and said auxiliary feed rolls being rotatably mounted in the same plane as that of the normal operative positions of the reel and stock-coil.

33. In a machine for fabricating long metal stock supplied in the form of heavy coils, the combination with a machine frame, a reel for supporting such a stock-coil, of stock-fabricating mechanism mounted in said frame; a reel-support having a mounting in said frame in fixed relation to the fabricating mechanism and normally supporting the reel and its stock-coil in operative relation thereto; a roll-stand adjacent the normal position of the stock-reel, also mounted in said frame and including stock-feed pinch-rolls and auxiliary feed-rolls said mounting of the reel-support being pivoted and the reel-support carrying an empty reel swinging from its said normal operating position to a different position for more convenient reception of a heavy stock-coil to be fabricated; and a counter-weight for the reel loaded with the heavy stock-coil, said counter-weight being mounted on said swinging reel-support.

34. In a machine for fabricating long metal stock supplied in the form of heavy coils, the combination with stock fabricating mechanism, of a roll-stand including pairs of pinch-feed rolls and also intermediate pairs of auxiliary feeding-rolls of which latter successive pairs are relatively staggered; vertical roll-spindles on which the feed-rolls and auxiliary feed-rolls are mounted horizontally; the rolls of each pair lying on opposite sides of the line of stock-feed; and the rolls and spindles on one side of said line being horizontally adjustable to and from the stock; mechanisms respectively intermittently driving the fabricating mechanism along the line of stock-feed and transversely thereof and continuously driving said roll-spindles; and operator's manipulating devices facing from a side of the machine and connected to those of the pairs of rolls and spindles which lie on the same side of the line of stock-feed.

35. In a long stock fabricating machine, the combination with initial pinch-feed rolls and auxiliary feeding-rolls, of intermittently operated fabricating mechanism movable in the line of the stock-feed and transversely thereof; a pair of auxiliary pinch-feed rolls located between the initial pinch-feed rolls and the fabricating mechanism; and gearing mechanisms positively and continuously driving said initial and auxiliary feed-rolls respectively, said gearing mechanisms being synchronized with another and with the rate of operation of said intermittently operated fabricating mechanism.

36. In a long stock fabricating machine, the combination with continuously operating mechanism feeding such stock horizontally, of a main driver; connections operating said feeding mechanism continuously by the power of said main driver; fabricating mechanism normally at rest and which the stock is fed continuously by said feeding mechanism; and a connection intermittently operating the fabricating mechanism by the power of said main driver and at a rate coordinated with the rate of said stock-feeding mechanism; said fabricating mechanism including a stationary part of the machine, a member reciprocating horizontally on said stationary part, a tool-carrier reciprocating vertically thru said horizontally reciprocating member, and a fabricating tool carried by said vertically-movable tool-carrier; said connection which intermittently operates said fabricating mechanism including an eccentric vertically reciprocating said tool carrier and thereby horizontally reciprocating said horizontally moving member and the fabricating tool.

37. In a long stock shearing machine, the combination with mechanism continuously operating feeding such stock horizontally, of shearing mechanism normally at rest to which the stock is fed by said feeding mechanism; and a power connection intermittently operating the shearing mechanism at a rate coordinated with the rate of said stock-feeding mechanism; said shearing mechanism including a stationary part of the machine, a shear-carrier reciprocating horizontally on said stationary part, a shearing tool on said carrier; a second shear-carrier reciprocating vertically thru said horizontally reciprocating carrier, and a second shearing tool on said second carrier; said connection which intermittently operates and said shearing mechanism including an eccentric reciprocating said second carrier and shearing tool and thereby reciprocating said first carrier and shearing tool.

38. In a long stock shearing machine, the combination with continuously operating feeding mechanism, of intermittently operating shearing mechanism; a uniformly-acting clutch including driving and driven elements the former constantly tending to drive the latter; stock-discharging mechanism; said shearing mechanism including two tools reciprocable in line with the direction of long-stock feed, one of which tools is movable simultaneously across the path of the moving stock; tool operating mechanism between said clutch and said shearing tools and said discharging mechanism and connected to the driven element of the clutch; means continuously driving the driving element of the clutch at a rate coordinated with the rate of said stock-feeding mechanism, means normally preventing said clutch-element from driving the driven clutch-element; master mechanism intermittently operating said preventing means and causing the driving clutch-element to drive the driven clutch-element.

39. In a long stock shearing machine, the combination with continuously operating initial feed-rolls and auxiliary feed-rolls; of intermittently operating shearing mechanism including two tools both reciprocable in line with the direction of the long-stock feed by said rolls and one at least simultaneously movable across the path of the moving stock; stock supporting and discharging mechanism; a slave driving the shearing and discharging mechanism, and a master controlling the operation of said slave and therefore the operations of the shearing and discharging mechanisms, said stock-receiving and discharging mechanism including a stock-guide receiving and supporting the stock in shearing position in line with the feed-rolls and shearing tools as it is fed beyond the tools, said guides being movable cyclically for gravity discharge of the sheared sub-length upon completion of shearing and for return to normal position to support the new van of the stock advancing between and beyond the tools before the tools complete their movement along the stock to their normal position of rest.

40. In a long stock fabricating machine, the combination with continuously operating feeding mechanism, of intermittently operating fabricating mechanism including a tool reciprocable in line with the direction of long-stock feed and simultaneously movable across the path of the moving stock; a uniformly-acting clutch for driving the fabricating mechanism; a master coordinated with the stock-feed and intermittently causing the clutch to drive the fabricating mechanism, the rate of the clutch being coordinated with the rate of said stock-feeding mechanism; main driving means common to the feeding mechanism and to said clutch and fabricating mechanism, all said mechanism being constructed for operation in time-relations coordinated for starting the intermittent movements of the tool along the stock after desired time intervals of continuous stock-feeding; and mechanism operated by the fabricating mechanism to discontinue the clutch drive of the fabricating mechanism.

41. In a long stock shearing machine, the combination with continuously operating initial feed-rolls, of continuously operating auxiliary feeding rolls; intermittently operating shearing mechanism including two tools both reciprocable in line with the direction of long-stock feed and at least one simultaneously movable across the path of the moving stock; eccentric mechanism operating said shearing mechanism; a slave for intermittently driving said eccentric mechanism and including an instantaneously self-locking clutch and means normally preventing such locking; and a master controlling the operation of said slave and including means operating said preventing means and causing such instantaneous self-locking of the clutch and initiation of operations of the eccentric mechanism and shearing mechanism.

42. In a long metal stock shearing machine of the general continuous feed type disclosed, the combination with continuously operated means feeding the long metal stock at uniform speed horizontally lengthwise, of intermittently operated shearing mechanism capable of producing long sub-lengths and including a clutch and also stock-shearing tools movable along the length of the stock but normally stationary in that direction; mechanisms respectively operating said feeding means and shearing mechanism in co-ordinated time-relations; means receiving the advance ends of the long metal stock successively fed before shearing between and beyond the shearing tools, and supporting said ends as they are moved beyond the tools before shearing and holding them during the shearing operations in horizontal line with the rest of the long stock at the feeding means and between the shearing tools, said supporting means being movable to subject the entire length of each successively sheared sub-length to the action of gravity upon completion of the shearing operation; and mechanism intermittently operated by said clutch and moving said stock-receiving and supporting means in time-relations coordinated with the feeding means and the operations of the shearing-tools by said clutch, whereby after the advanced ends of the stock have been supported successively in horizontally linear shearing positions up to the instant of shearing, they are discharged by gravity upon completion of shearing from said supporting means and out of the horizontal path of the continuously advancing stock.

43. In a long metal stock shearing machine of the general continuous feed type disclosed, the combination with continuously operated means feeding the stock at uniform speed horizontally lengthwise, of intermittently operated shearing mechanism capable of producing long sub-lengths and including a clutch and stock-shearing tools movable along the length of the stock but normally stationary in that direction; mechanisms operating said feeding means and shearing mechanism in coordinated time-relations; means supporting the advance ends of the long metal stock successively fed beyond the shearing tools, said means receiving and supporting said ends as they are moved beyond the shearing tools and holding them during the shearing operations in line with the rest of the long stock at the feeding means and between the shearing tools; and mechanism intermittently operated by said clutch and subjecting the entire length of the successively sheared sub-lengths of stock to the action of gravity immediately upon completion of the shearing operation, thereby removing the sheared sub-lengths from out of the horizontal path of the ends of the long stock starting to move beyond the shearing tools immediately after shearing.

44. In the long-stock shearing machine of claim 52, the second tool-carrier being formed with a perforation for the passage of the stock, and one of said tools being mounted on said carrier inside said perforation and itself formed with a stock-passage substantially conforming to the surfaces of the stock and holding the stock from undesired movement during shearing.

45. In the long-stock shearing machine of claim 52, the means for revolving the first carrier including a shaft, an offset carried by said shaft and connected to said first carrier; and a clutch carried by the shaft which carries said offset.

46. In the long-stock machine of claim 52, the means revolving the first carrier including two offsets located at opposite sides of said carrier and connected thereto.

47. In a long-stock shearing-machine, the combination with the shearing tools and carriers therefor reciprocable along the stock-path, of a roll-stand feeding the stock for shearing, a stock-reel from which the stock is pulled by the rolls of the roll-stand, said roll-stand rolls including a set of pinch-feed-rolls pushing the stock to said shearing mechanism, a second set of pinch-feed-rolls pulling the stock in a direction toward said first roll-set, auxiliary feeding rolls intermediate said first and second sets of pinch-feed-rolls and located along the path of the stock in general alinement with the two sets of pinch-feed rolls of the same roll-stand and feeding the stock from said second set of pinch-feed rolls to said first set of pinch-rolls, and power means positively rotating the rolls of said roll-stand including the first and second sets of pinch-feed-rolls and the intermediate set of rolls.

48. In the long-stock shearing machine of claim 47, the rolls of the roll-stand of said claim being of comparatively small diameter, a set of rolls independent of said roll-stand, of substantially larger diameter than said rolls thereof, and located between the roll-stand and the shearing mechanism which reciprocates along the path of stock-feed, and power means positively rotating said independent larger pinch-rolls at a rate coordinated with the rate of the rolls of the roll-stand and with the rate of the shearing mechanism along the path of stock-feed.

49. In a long-stock shearing machine the combination with the shearing tools and carriers therefor reciprocable along the stock-path, of a roll-stand feeding the stock for shearing, a stock-reel from which the stock is pulled by the rolls of the roll-stand, said rolls including a set of pinch-feed rolls pushing the stock to said shearing mechanism, a second set of pinch-feed-rolls pulling the stock in a direction toward said first roll-set, auxiliary feed rolls intermediate said sets of pinch-feed-rolls along the path of the stock and feeding the stock from the second to the first set of pinch-rolls, and power means positively rotating the rolls of said roll-stand; the rolls of the roll-stand being of comparatively small diameter, a set of rolls independent of said roll-stand, of substantially larger diameter than said rolls thereof, and located as pinch-rolls between the roll-stand and the shearing mechanism which reciprocates along the path of stock-feed; and power means positively rotating said independent larger pinch-rolls; the rolls on the roll-stand being provided with spindles arranged parallel to the axis of the reel, and said spindles on one side of the stock being adjustable to and from those on the other side of the stock; said power mechanism positively rotating said rolls being arranged for operation in various of said adjusted positions of said spindles.

50. In the long-stock shearing machine of claim 47, the means for intermittently operating the reciprocable tool-carriers thereof, which includes driving means, braking means normally holding said carriers from reciprocation by said driving means, normally ineffective wedging means interposed between said driving means and said carriers, and means intermittently putting said interposed means in effective wedged relation between said driving means and carriers.

51. In a machine for shearing long stock into relatively short sub-lengths, the combination with the two shearing tools, of continuously operating means feeding the long stock longitudinally, two reciprocable members respectively carrying said tools, one of which members is reciprocable along the path of the stock being fed and the other of which is reciprocable across the path of the stock being fed; and driving means reciprocating one of said tool-carrying members over a distance substantially shorter than the short sheared sub-lengths of stock; the two tool-carrying members being cooperatively constructed and arranged for positive reciprocation of the second member in both its directions of its reciprocation, by means of said reciprocation of the first member by said driving means.

52. In a machine for shearing long stock into relatively short sub-lengths, the combination with the two shearing-tools, of continuously operating means feeding the long stock longitudinally; a carrier for the tool which moves across the path of stock-feed; a second carrier, for the other tool, and reciprocable along the stock-path; and driving means revolving said first carrier in a circle having a diameter which is short relative even to the short sheared sub-lengths of stock; said two carriers being cooperatively constructed and arranged for positive reciprocation of the second carrier in both directions of its reciprocation, by means of said revolution of the first carrier by said driving means.

53. In a machine for shearing long stock into relatively short sub-lengths, the combination with the two shearing tools, of continuously operating means feeding the long stock longitudinally; a carrier for the tool which moves across the path of stock-feed; a second carrier, for the other tool, and reciprocable along the stock-path; revolvable tool-operating means, extending transversely of the stock-path, and revolving the first carrier along the path of the stock and the path of the second carrier, said operating means having a diameter of revolution which is short relative even to the short sub-lengths of stock; said two carriers being cooperatively constructed and arranged for positive reciprocation of the second carrier in both directions of its reciprocation, by means of said revolution of the first carrier by said operating means; and means for varying the frequency, relative to the rate of the stock-feeding means, of the successive traverses across the stock-path, of the tool on said first carrier.

54. In a long-stock shearing machine, the combination with the frame, of mechanism continuously feeding the long stock lengthwise; two shearing members movable along the stock-path over a distance which is substantially shorter than the sheared sub-length of stock and which is the same for widely different lengths of sheared stock; two parallel shafts extending across the stock-path; stationary bearings in which said shafts are mounted in said frame; parallel arms rigid with said shafts and extending radially therefrom; one of said shearing members having pivotal connections with said arms at fixed points distant from the shafts by half said relatively short length of movement of said shearing member along the stock-path whereby said shearing member is revolved along said path in a circle of the same diameter for the different lengths of sheared stock and over said substantially shorter distance along the stock-path; the other shearing member being reciprocable rectilinearly along the stock-path and having sliding relation with said revolving shearing member; two shearing tools rigidly combined with said two shearing members respectively; and adjustable master means controlling the frequency of the complete cycles of operation of said shearing members and tools and causing variation of the lengths of sheared stock without varying the relations of said shafts, arms, shearing members or tools.

55. In a long-stock shearing machine, the combination with the frame, of mechanism continuously feeding the long stock lengthwise; two shearing members movable along the stock-path over a distance which is substantially shorter than the sheared sub-lengths of stock and which is the same for widely different lengths of sheared stock; two shafts in positions at right angles to the stock-path; stationary bearings for said shafts in said frame; parallel arms rigid with said shafts and extending radially therefrom; one of said shearing members having pivotal connections with said arms at fixed points distant from the shafts by half said relatively short length of movement of said shearing member along the stock-path whereby said shearing member is revolved along said path in a circle of the same diameter for the different lengths of sheared stock and over said substantially shorter distance along the stock-path, the other shearing member being reciprocable rectilinearly along the stock-path and having sliding relation with said revolving shearing member; two shearing tools rigidly combined with said two shearing members respectively; and adjustable master means controlling the frequency of the complete cycle of operation of said shearing members and tools and causing variation of length of sheared stock without varying the relations of said shafts, arms, shearing members or tools.

56. In a long-stock shearing machine, the combination with means feeding the stock lengthwise, of two shearing members having inter-sliding relation and both movable along the stock-path over a distance which is substantially shorter than the sheared sub-length of stock and which is the same for widely different lengths of sheared stock; two shafts having lateral arms respectively connected movably with one of said shearing members and revolving it over said short distance along the stock-path, said shafts, arms and shearing mechanism having permanently fixed operative relations; mechanism driving one of said shafts; mechanism continuously operating said driving means and said stock-feeding means; the other shearing member being rectilinearly reciprocable along the stock path and its sliding relation with the revolving shearing member including a structure of the two members by which the reciprocable member is reciprocated by the revolution of the revolvable member, the permanent length of said arms being coordinated with the rate of said continuously operating mechanism causing a length and rate of movement of the shearing members which are coordinated with the rate of stock-feed for like rates of stock and shearing members along the stock-path at the instant of shearing; and an adjustable master means controlling the frequency of the complete cycles of operation of said shearing members.

57. In a long-stock shearing machine, the combination with means feeding the stock lengthwise, of two shearing members having inter-sliding relations and arrangements whereby a revolution of one of them positively reciprocates the other in both directions along the path of stock-feed; mechanism revolving one of said shearing members in a circle which is substantially smaller in diameter than the sheared sub-length of stock and which circle is the same in diameter for widely different lengths of sheared stock; mechanism driving said revolving mechanism; mechanism continuously operating said driving means and said stock-feeding means; the effective short operating diameter of said revolving means being coordinated with the rate of said continuously operating mechanism causing a length and rate of movement of the shearing members coordinated with the rate of stock-feed, whereby said short movement of the shearing members along the stock-path is accompanied by like rate of said members and of the stock for the different and greater lengths of sheared sub-lengths of stock; and master means controlling the frequency of the complete cycles of operation of said shearing members.

58. The invention according to claim 57 wherein the mechanism which revolves one of the shearing members includes rotating means extending at right angles to the stock-path and located at opposite portions of said shearing members, and means also at opposite portions of said shearing member and rigidly connected to said rotating means and revolved thereby and pivotally connected with said opposite portions of said shearing member.

59. The long stock machine of claim 52 wherein the second tool-carrier is formed with a perforation for the passage of the stock, one of the tools is mounted on said carrier inside said perforation and itself is formed with a perforation for the passage of the stock substantially conforming to the configuration of the stock, and the means revolving the first carrier includes two offset means connected thereto but located for revolution at opposite sides of said stock passage.

60. The long stock shearing machine of claim 52 wherein are included a clutch driving the revolving means, a master control and fly-wheel controlling the start of the clutch and revolving means and determining the length of successively sheared sub-lengths of the long stock; an arrangement of the tool-carriers in position relative to the stock-path which locates the center of revolution of the revolving tool at a point causing passage of said tool across the stock-path for shearing when said tool is within approximately one-quarter revolution of its extreme position of movement in the direction transversely of the stock-path; and means braking the revolving means in a position of rest upon completion of one revolution.

61. The long-stock shearing machine of claim 52 wherein said revolving means is arranged for revolution of said first carrier and its tool first in a direction opposite to that of the stock-movement and then in the direction of the stock for shearing; and wherein means are provided normally holding said revolving means in position for said commencement of revolution in the direction opposite to the stock-movement; and wherein master-control means are included determining the length of successively sheared sub-lengths of the long stock; and wherein said tool-carriers are arranged in position relative to the stock-path which locates the center of revolution of the revolving tool at a point causing passage of said tool across the stock-path for shearing when said tool is within approximately one-quarter revolution of its extreme position of movement in the direction transversely of the stock-path.

62. In a long stock fabricating machine, the combination with continuously operating stock-feeding mechanism, of a fabricating tool intermittently reciprocable in a direction in line with the long-stock feed and simultaneously movable also across the path of the moving stock; mechanism effecting said tool-operations; a uniformly-acting roll-locking clutch operatively connectible to said tool-reciprocating mechanism and including a driven member and a spring normally tending to turn the driven member into wedge-locking engagement with the driving clutch-member; a stopping device normally preventing such turning of the driven member; mechanism intermittently causing operation of said stopping device and thereby causing such operative clutch-connection; and mechanism causing movement of said stopping device into its normal clutch connection-preventing relation upon completion of the fabricating operation, said tool-operating mechanism including two inter-sliding members of which one is a carrier for the tool which operates it positively in all its said directions of movement.

JOSEPH H. ROBERTS.